US011100477B1

(12) United States Patent
Kemper et al.

(10) Patent No.: US 11,100,477 B1
(45) Date of Patent: Aug. 24, 2021

(54) ELECTRONIC CAPITAL MARKETPLACE SYSTEMS AND METHODS

(71) Applicant: Pollen, Inc., Fairway, KS (US)

(72) Inventors: Alexander C. Kemper, Kansas City, MO (US); Kevin J. Daniels, Leawood, KS (US); Peter L. Thomas, Kansas City, MO (US); John G. Christopher, Kansas City, KS (US); Douglas A. Martin, Kansas City, MO (US)

(73) Assignee: Pollen, Inc., Fairway, KS (US)

( * ) Notice: Subject to any disclaimer, the term of this patent is extended or adjusted under 35 U.S.C. 154(b) by 965 days.

(21) Appl. No.: 15/002,043

(22) Filed: Jan. 20, 2016

Related U.S. Application Data

(60) Provisional application No. 62/105,655, filed on Jan. 20, 2015.

(51) Int. Cl.
*G06Q 20/10* (2012.01)
*G06Q 30/02* (2012.01)
*G06Q 40/04* (2012.01)

(52) U.S. Cl.
CPC ....... *G06Q 20/102* (2013.01); *G06Q 30/0215* (2013.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 6,691,094 B1 * | 2/2004 | Herschkorn | ....... | G06Q 30/0611 705/26.4 |
| 2003/0144938 A1 * | 7/2003 | Lahre | ..... | G06Q 10/04 705/36 R |
| 2005/0283437 A1 * | 12/2005 | McRae | ........ | G06Q 20/102 705/40 |
| 2011/0307345 A1 * | 12/2011 | Kemper | ......... | G06Q 30/08 705/26.3 |
| 2014/0019346 A1 * | 1/2014 | Eliscu | ........ | G06Q 30/0633 705/40 |

OTHER PUBLICATIONS

Author unknown, Early Payment on the Ariba Network, May 2012, entire document pertinent, retrieved from: https://websmp102.sap-ag.de/~sapidp/011000358700000302562014E (Year: 2012).*
Knott, What is Private Key Encryption, 2014, entire document pertinent, retrieved from https://web.archive.org/web/20140306101755/http://www.koolspan.com/blog/private-key-encryption/ (Year: 2014).*

* cited by examiner

*Primary Examiner* — Elda G Milef
*Assistant Examiner* — Gregory S Cunningham, II
(74) *Attorney, Agent, or Firm* — Shook, Hardy & Bacon L.L.P.

(57) ABSTRACT

A system receives information for a plurality of invoices having invoice amounts owed by a debtor-buyer to a plurality of creditor-suppliers, a cash pool amount for a cash pool available by the debtor-buyer for early payment of at least some of the invoice amounts, and a desired return rate, receives a plurality of offers, each offer from a corresponding creditor-supplier and comprising an offer return rate, determines whether each of the plurality of offers is eligible for acceptance based on each offer return rate from each offer and the desired return rate for the buyer and selects one or more invoices each having an invoice amount, and transmits award information to the debtor-buyer.

63 Claims, 17 Drawing Sheets

FIG. 15

ELECTRONIC CAPITAL MARKETPLACE SYSTEMS AND METHODS

RELATED APPLICATIONS

This application takes priority to U.S. Patent App. Ser. No. 62/105,655, entitled Electronic Capital Marketplace Systems and Methods, filed Jan. 20, 2015, the entire contents of which are incorporated herein by reference.

FEDERALLY SPONSORED RESEARCH OR DEVELOPMENT

Not Applicable.

COMPACT DISK APPENDIX

Not Applicable.

FIELD

The present systems and methods provide an electronic auction based marketplace for working capital and accelerating payment of one or more debt obligations owed by a debtor-buyer to one or more creditor-suppliers at a unique price for each creditor-supplier. More particularly, the systems and methods relate generally to filling cash pools available from one or more debtor-buyers for early payment of debt obligations owed by the debtor-buyer to one or more creditor-suppliers based on one or more offers from the one or more creditor-suppliers that each include a return to the debtor-buyer in exchange for the early payment to the creditor-supplier.

BACKGROUND

For businesses, it may take sixty, ninety, or more days to be paid for goods, services, or another account payable or credit. In the meantime, the buyer of the goods, services, or another account payable or credit may capitalize on delayed payment using less than desirable investment options having low returns. The creditor alternately may have to seek borrowing and funding options at high rates. Thus, a barrier exists between buyers' accounts payable and the suppliers' accounts receivable.

Traditionally, working capital finance has been provided by intermediaries without incentive to create transparency or make the capital readily available for businesses. Conventionally, systems aimed to minimize payment for the buyer and maximize payment for the one or more suppliers but were unable to encourage continued participation by the buyer and the one or more suppliers. These shortcomings associated with traditional working capital finance do not let the capital flow freely between businesses.

SUMMARY

Briefly described, and according to one embodiment, aspects of the present disclosure generally relate to systems and methods for determining one or more offers from one or more suppliers for discounted early payment of one or more invoices. The systems and methods fill a cash pool having a particular value at a desired return with the one or more invoices. The desired return may be a blended weighted return based on the return from each of the one or more invoices.

In one aspect, a system provides a marketplace for one or more buyer client computing devices and one or more supplier client computing devices. The system includes a server computing device for receiving information identifying a desired return and a value of a cash pool available from a buyer for payment of one or more debt obligations in exchange for the desired return, receiving information associated with one or more debt obligations, such as one or more invoices, to fill the cash pool for early payment, receiving one or more offers identifying one or more returns for the one or more invoices that one or more suppliers are willing to offer in exchange for early payment, and selecting some of the one or more offers for the one or more debt obligations to fill the cash pool.

In one aspect the one or more offers are selected using a particular algorithm. The particular algorithm may be one or more of a process for selecting some of the one or more invoices to fill the entire cash pool at exactly the desired return, selecting some of the one or more invoices to fill the entire cash pool at least at the desired return and splitting any extra return between the suppliers and the buyer, and selecting the one or more invoices to fill the entire cash pool at least at the desired return based on an under hurdle percentage.

According to one embodiment, a system includes one or more processors to receive information for a plurality of invoices having invoice amounts owed by a debtor-buyer to a plurality of creditor-suppliers, a cash pool amount for a cash pool available by the debtor-buyer for early payment of at least some of the invoice amounts, and a desired return rate for the debtor-buyer, receive a plurality of offers, each offer from a corresponding creditor-supplier and comprising an offer return rate in exchange for early payment of at least one invoice amount owed by the debtor-buyer to the corresponding creditor-supplier, determine whether each of the plurality of offers is eligible for acceptance based on each offer return rate from each offer and the desired return rate for the buyer and select one or more invoices each having an invoice amount associated with one or more eligible offers from one or more of the creditor-suppliers for early payment from the cash pool amount so that a weighted average of the offer return rates from the selected one or more invoices is at least equal to the desired return rate of the buyer, the weighted average of the offer return rates being equal to a total of all weighted return rates for the selected one or more invoices divided by a total invoice amount of the selected one or more invoices, each weighted return rate for each selected invoice being equal to the invoice amount of the selected invoice multiplied by the offer return rate for the selected invoice, and transmit award information to the debtor-buyer, the award information indicating the selected one or more invoices for early payment from the cash pool amount.

According to another embodiment, a system includes one or more processors to receive accounts payable information for accounts payable amounts owed by a debtor-buyer to a plurality of creditor-suppliers, a cash pool amount for a cash pool available by the debtor-buyer for early payment of at least some of the accounts payable, and a desired return rate for the debtor-buyer, receive a plurality of offers, each offer from a corresponding creditor-supplier and comprising an offer return rate in exchange for early payment of at least some of the accounts payable amount owed by the debtor-buyer to the corresponding creditor-supplier, determine whether each of the plurality of offers is eligible for acceptance based on each offer return rate from each offer and the desired return rate for the buyer and select one or more accounts payable amounts associated with one or more eligible offers from one or more of the creditor-suppliers for early payment from the cash pool amount so that a weighted average of the offer return rates from the eligible offers associated with the selected one or more accounts payable amounts is at least equal to the desired return rate of the buyer, the weighted average of the offer return rates being equal to a total of all weighted return rates associated with the selected one or more accounts payable amounts divided by a total amount of the selected one or more accounts payable amounts, each weighted return rate associated with each selected accounts payable amount being equal to the selected accounts payable amount multiplied by the offer return rate for the selected accounts payable amount, and transmit award information to the debtor-buyer, the award information indicating the selected one or more accounts payable for early payment from the cash pool amount.

According to a further embodiment, a method includes receiving, by at least one processor, information for a plurality of invoices having invoice amounts owed by a debtor-buyer to a plurality of creditor-suppliers, a cash pool amount for a cash pool available by the debtor-buyer for early payment of at least some of the invoice amounts, and a desired return rate for the debtor-buyer, receiving, by the at least one processor, a plurality of offers, each offer from a corresponding creditor-supplier and comprising an offer return rate in exchange for early payment of at least one invoice amount owed by the debtor-buyer to the corresponding creditor-supplier, determining, by the at least one processor, whether each of the plurality of offers is eligible for acceptance based on each offer return rate from each offer and the desired return rate for the buyer and selecting one or more invoices each having an invoice amount associated with one or more eligible offers from one or more of the creditor-suppliers for early payment from the cash pool amount so that a weighted average of the offer return rates from the selected one or more invoices is at least equal to the desired return rate of the buyer, the weighted average of the offer return rates being equal to a total of all weighted return rates for the selected one or more invoices divided by a total invoice amount of the selected one or more invoices, each weighted return rate for each selected invoice being equal to the invoice amount of the selected invoice multiplied by the offer return rate for the selected invoice, and transmitting, by the at least one processor, award information to the debtor-buyer, the award information indicating the selected one or more invoices for early payment from the cash pool amount.

According to an even further embodiment, a method includes receiving, by at least one processor, accounts payable information for accounts payable amounts owed by a debtor-buyer to a plurality of creditor-suppliers, a cash pool amount for a cash pool available by the debtor-buyer for early payment of at least some of the accounts payable, and a desired return rate for the debtor-buyer, receiving, by the at least one processor, a plurality of offers, each offer from a corresponding creditor-supplier and comprising an offer return rate in exchange for early payment of at least some of the accounts payable amount owed by the debtor-buyer to the corresponding creditor-supplier, determining, by the at least one processor, whether each of the plurality of offers is eligible for acceptance based on each offer return rate from each offer and the desired return rate for the buyer and selecting one or more accounts payable amounts associated with one or more eligible offers from one or more of the creditor-suppliers for early payment from the cash pool amount so that a weighted average of the offer return rates from the eligible offers associated with the selected one or more accounts payable amounts is at least equal to the desired return rate of the buyer, the weighted average of the offer return rates being equal to a total of all weighted return rates associated with the selected one or more accounts payable amounts divided by a total amount of the selected one or more accounts payable amounts, each weighted return rate associated with each selected accounts payable amount being equal to the selected accounts payable amount multiplied by the offer return rate for the selected accounts payable amount, and transmitting, by the at least one processor, award information to the debtor-buyer, the award information indicating the selected one or more accounts payable for early payment from the cash pool amount.

According to another embodiment, a non-transitory computer-readable medium includes instructions stored thereon that, when executed by one or more processors, cause the one or more processors to perform operations including receiving information for a plurality of invoices having invoice amounts owed by a debtor-buyer to a plurality of creditor-suppliers, a cash pool amount for a cash pool available by the debtor-buyer for early payment of at least some of the invoice amounts, and a desired return rate for the debtor-buyer, receiving a plurality of offers, each offer from a corresponding creditor-supplier and comprising an offer return rate in exchange for early payment of at least one invoice amount owed by the debtor-buyer to the corresponding creditor-supplier, determining whether each of the plurality of offers is eligible for acceptance based on each offer return rate from each offer and the desired return rate for the buyer and selecting one or more invoices each having an invoice amount associated with one or more eligible offers from one or more of the creditor-suppliers for early payment from the cash pool amount so that a weighted average of the offer return rates from the selected one or more invoices is at least equal to the desired return rate of the buyer, the weighted average of the offer return rates being equal to a total of all weighted return rates for the selected one or more invoices divided by a total invoice amount of the selected one or more invoices, each weighted return rate for each selected invoice being equal to the invoice amount of the selected invoice multiplied by the offer return rate for the selected invoice, and transmitting award information to the debtor-buyer, the award information indicating the selected one or more invoices for early payment from the cash pool amount.

According to another embodiment, a non-transitory computer-readable medium includes instructions stored thereon that, when executed by one or more processors, cause the one or more processors to perform operations including receiving accounts payable information for accounts payable amounts owed by a debtor-buyer to a plurality of creditor-suppliers, a cash pool amount for a cash pool available by the debtor-buyer for early payment of at least some of the accounts payable, and a desired return rate for the debtor-buyer, receiving a plurality of offers, each offer from a corresponding creditor-supplier and comprising an offer return rate in exchange for early payment of at least some of the accounts payable amount owed by the debtor-buyer to the corresponding creditor-supplier, determining whether each of the plurality of offers is eligible for acceptance based on each offer return rate from each offer and the desired return rate for the buyer and selecting one or more accounts payable amounts associated with one or more eligible offers from one or more of the creditor-suppliers for early payment from the cash pool amount so that a weighted average of the offer return rates from the eligible offers associated with the selected one or more accounts payable amounts is at least equal to the desired return rate of the buyer, the weighted average of the offer return rates being equal to a total of all weighted return rates associated with the selected one or more accounts payable amounts divided by a total amount of the selected one or more accounts payable amounts, each weighted return rate associated with each selected accounts payable amount being equal to the selected accounts payable amount multiplied by the offer return rate for the selected accounts payable amount, and transmitting award information to the debtor-buyer, the award information indicating the selected one or more accounts payable for early payment from the cash pool amount.

According to one embodiment, a computer implemented system and method conducts a payment auction for early payment of a plurality of debt obligations owed to a corresponding plurality of creditor-suppliers by a debtor-buyer. The computer implemented system and method offer to each authorized creditor-supplier to whom the debtor-buyer owes a specific debt obligation, via a network interface controller, the specific debt obligation being associated with an available inventory of debt obligations, with the offer including a stated price for the specific debt obligation owed by the debtor-buyer to the authorized supplier. The computer implemented system and method receive, via the network interface controller, a plurality of offers from a plurality of authorized creditor-suppliers, each offer of the plurality of offers corresponding to the specific debt obligation owed by the debtor-buyer to the authorized creditor-supplier making the offer and specifying an offer amount in terms of a return rate (e.g. annual percentage rate or discount rate) for the specific debt obligation as a portion of the stated price for the specific debt obligation. In addition, the computer implemented system and method determine, using a processor coupled to the network interface controller and a storage medium, an eligibility for acceptance of multiple offers of the plurality of offers based at least in part on the offer amount for the specific debt obligation associated with each offer of the plurality of offers, wherein determining an eligibility for acceptance includes accepting multiple offers at different return rates. Further, the computer implemented system and method indicate, via the network interface controller, the eligibility for acceptance of the multiple offers relative to other offers of the plurality of offers.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 10-16 illustrate example screenshots of user interfaces of the order application according to an example embodiment.

DETAILED DESCRIPTION

Figure 1:
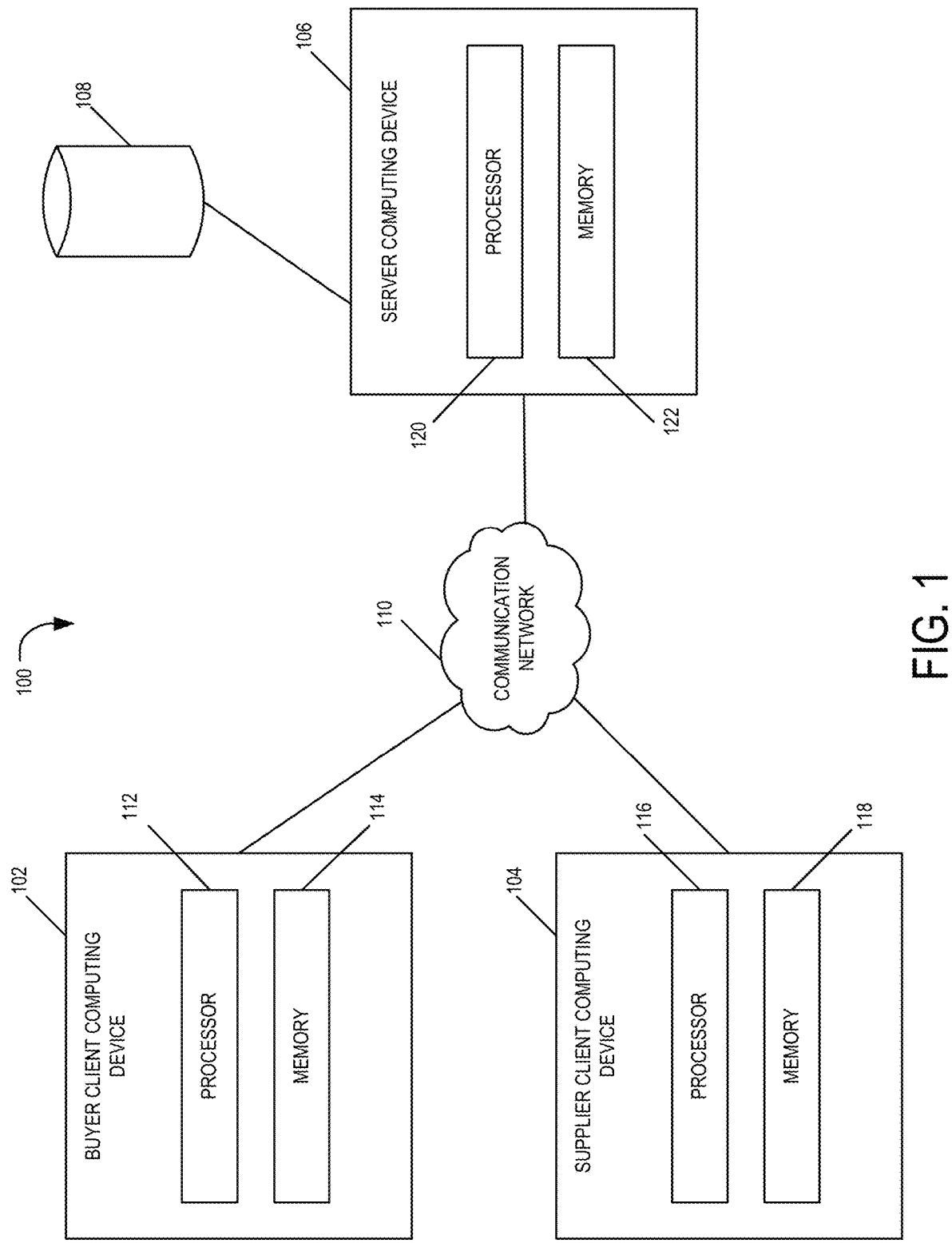
FIG. 1 illustrates a block diagram of an order system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The example embodiments provide each discrete buyer of a plurality of buyers having a unique cash flow situation an opportunity to receive a disparate return rate (e.g. annual percentage rate or discount rate) for early payment of accounts payable and each discrete supplier of a plurality of suppliers having a unique cash flow situation an opportunity to receive an early payment of accounts receivable at a disparate return rate. The order system provides a marketplace that discovers utility based prices for accounts payable or other debt obligation for each discrete buyer and utility based prices for accounts receivable or other credit for each discrete supplier. The order system discovers these utility based prices by executing one or more algorithms to determine how to select accounts receivables for early payment from an available cash pool at least at a desired return to a buyer by selecting one or more offers provided by one or more suppliers of the buyer.

The systems and methods disclosed herein describe a dynamic marketplace effected by an order system that provides multi-party price discovery of homogenous assets and liabilities through a real-time, condition-based, optimized collaborative auction platform (OCAP). The OCAP enables a multi-bidder auction experience where a bidder may be maximizing an offer value that another bidder may attempt to minimize based on, e.g., the bidder's desire for increased liquidity. Moreover, each offer may be adjusted by the system to be a winning offer without revealing that information to the plurality of bidders.

As an example, a debtor-buyer may wish to pay its obligations early in order to receive favorable discounting terms from its creditor-suppliers. At the same time, each creditor-supplier may reject proposed credit terms from a bank or other financial institution that are not tailored to their current financial concerns. Systems and methods herein permit the discovery and creation of individualized credit terms acceptable to each creditor-supplier and debtor-buyer through multi-winner auctions based on a blended weighted average annual percentage rate (APR) or discount rate. In the dynamic marketplace provided by systems and methods herein, businesses that need cash are able to name their own price for the cash that is owed to them by their customers. The fair market value for the working capital is unique for each company depending on their financial status, condition, or needs, such as its alternative cost and availability of borrowing, cash flow, cash needs, and other factors. When a business that needs cash participates in the dynamic marketplace, they order cash at a price that is specifically tailored for that business. Businesses are not competing for funding with other businesses. Rather they are competing against their borrowing costs, e.g., a bank, factor, asset based lender, or another third party provider.

Cash and cash flow may have different costs for different businesses and at different periods of time. Each business associated with the dynamic marketplace may have specific cycles and needs for cash and cash flow. There may be times when a business is flush with cash and other times when the business is strapped for cash. The systems and methods herein provide utility based pricing solutions for buyers' and suppliers' changing dynamic cost of working capital over peaks and valleys throughout the fiscal year. Traditional funding solutions do not allow for discrete pricing and timing of cash and cash flow. As a result, the dynamic marketplace provides an efficient and fair marketplace for working capital for businesses.

As an example, a buyer may have three different suppliers, A, B, and C. The three different suppliers, A, B, and C, and the buyer each may have a disparate, changing dynamic cost of working capital over peaks and valleys throughout the fiscal year. For the buyer, the dynamic cost of working capital may be a higher rate for the first and second quarters of the fiscal year and then gradually decline to a lower rate during the third and fourth quarters of the fiscal year. For supplier A, the dynamic cost of working capital may be at a first rate for the first quarter of the year, gradually changing to a second rate for the second quarter of the year, gradually changing to a third rate for the third quarter of the year, and gradually changing to a fourth rate for the fourth quarter of the year. For supplier B, the dynamic cost of working capital may be at a fifth rate for the first quarter of the year, gradually changing to a sixth rate for the second quarter of the year, gradually changing to a seventh rate for the third quarter of the year, and gradually changing to an eighth rate for the fourth quarter of the year. For supplier C, the dynamic cost of working capital may be at a ninth rate for the first quarter of the year, gradually changing to a tenth rate for the second quarter of the year, gradually changing to an eleventh rate for the third quarter of the year, and gradually changing to a twelfth rate for the fourth quarter of the year. Each of these rates may be up or down with respect to the prior rate. The dynamic marketplace allows the buyer to accept offers based on the buyer's changing, dynamic cost of working capital and based on each supplier's changing, dynamic cost of working capital. In addition, the dynamic marketplace allows each supplier to receive early payment based on the buyer's changing, dynamic cost of working capital and their specific changing, dynamic cost of working capital.

Buyers are debtors of suppliers, and suppliers are creditors of buyers. For example, buyers may hold accounts payable to creditor-suppliers or otherwise owe money or have other debt obligations to the creditor-suppliers. The accounts payable (AP) or other funds or debt obligations are due to the creditor-suppliers in a certain number of days. The debtor-buyer may offer to pay the AP or other debt obligation or funds early in exchange for a specified return rate, expressed, for example, as an APR, a discount rate, or a value. Creditor-suppliers (bidders) may submit offers to receive early payment of its AP or other funds based on a rate (e.g. APR or discount it selects).

The systems and methods of the present disclosure enable one or more sellers of payment of short term accounts payable or other debt obligation to participate in an online, electronic auction and to vary the timeline for the payment of their obligation to one or more suppliers. A buyer may have short term trade debt obligating the buyer to pay one or more suppliers at a future point in time. The buyer may wish to expedite payment in exchange for a discounted payment amount by offering one or more invoice opportunities to the one or more suppliers. Some suppliers may prefer to expedite payments for liquidity reasons. Other suppliers may prefer to defer payment in exchange for a premium to the original amount due, considering the premium to be a better investment than short-term debt or money market funds.

Buyers would like to maximize profit, increase gross margin, increase yields, minimize supplier costs, and strengthen their supply chain. On the other hand, suppliers want to optimize cash flow, maximize profit, reduce days sales outstanding (DSO), reduce the cost of funding, and improve relationships. The example embodiments provide these benefits to both the buyers and the suppliers.

According to some embodiments disclosed herein, a computer implemented system and method for conducting a payment auction are provided. The computer implemented system and method receive a plurality of offers from a plurality of bidders (e.g., creditor-suppliers), each offer of the plurality of offers being associated with at least one bidder of the plurality of bidders and each offer of the plurality of offers having an associated return rate, determine an eligibility for acceptance of multiple offers of the plurality of offers based in part on the return rate, and indicate the eligibility for acceptance of the multiple offers relative to other offers of the plurality of offers.

According to another embodiment, a computer implemented system and method conducts a payment auction for early payment of a plurality of debt obligations owed to a corresponding plurality of creditor-suppliers by a debtor-buyer. The computer implemented system and method offer to each authorized creditor-supplier to whom the debtor-buyer owes a specific debt obligation, via a network interface controller, the specific debt obligation being associated with an available inventory of debt obligations, with the offer including a stated price for the specific debt obligation owed by the debtor-buyer to the authorized supplier. The computer implemented system and method receive, via the network interface controller, a plurality of offers from a plurality of authorized creditor-suppliers, each offer of the plurality of offers corresponding to the specific debt obligation owed by the debtor-buyer to the authorized creditor-supplier making the offer and specifying an offer amount in terms of a return rate (e.g. annual percentage rate or discount rate) for the specific debt obligation as a portion of the stated price for the specific debt obligation. In addition, the computer implemented system and method determine, using a processor coupled to the network interface controller and a storage medium, an eligibility for acceptance of multiple offers of the plurality of offers based at least in part on the offer amount for the specific debt obligation associated with each offer of the plurality of offers, wherein determining an eligibility for acceptance includes accepting multiple offers at different return rates. Further, the computer implemented system and method indicate, via the network interface controller, the eligibility for acceptance of the multiple offers relative to other offers of the plurality of offers.

According to another embodiment, one or more client computing devices communicate with a server computing device providing the dynamic marketplace using a communications network. The server computing device provides a centrally accessible endpoint and resources associated with the marketplace. Buyer client computing devices display a web-based user interface to allow a buyer user to submit invoice opportunities, a cash pool amount, and a desired return amount for early payment. Supplier client computing devices may display a web-based user interface to allow a supplier user to submit one or more offers comprising a discount that the supplier user is willing to accept in exchange for early payment of the one or more invoices.

The client computing devices and the server computing device communicate over a communication network using Hypertext Transfer Protocol (HTTP) and/or other communications protocols. HTTP provides a request-response protocol in the client-server computing model. A web browser running on the client computing device may be a client and an application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

As an example, the server computing device receives a first HTTP request from a debtor-buyer client computing device to place one or more invoice opportunities on the marketplace for early payment with an optional maximum cash pool. The cash pool is an amount of money or other credit available to be paid based on an auction for early payment from a debtor-buyer to one or more creditor-suppliers (bidders) for one or more invoices, funds, or other debt obligations owed by the debtor-buyer to the one or more creditor-suppliers (bidders). The server computing device returns a response message to the web browser running on the debtor-buyer client computing device that visually indicates a current status of the invoice opportunities and information associated with the invoice opportunities and the cash pool. The server computing device receives a creditor-supplier HTTP request from a second client computing device associated with the invoice opportunities to submit an offer for early payment. The server computing device returns a response message to the web browser running on the creditor-supplier client computing device that visually indicates a current status of the offer, the invoice opportunities, and information associated with the offer and the invoice opportunities.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

The systems and methods of the present disclosure further may use or incorporate systems and methods of U.S. application Ser. No. 13/175,287, filed on Jul. 1, 2011, U.S. Publication No. 2011/0307345, entitled "Dynamic Discounting System and Method," or U.S. application Ser. No. 12/262,477, filed on Oct. 31, 2008, U.S. Publication No. 2010/0114676, entitled "Dynamic Discounting System and Method," both of which are hereby incorporated herein in their entirety by reference.

FIG. 1 illustrates a block diagram of an order system 100 according to an example embodiment that accelerates early payment of a same asset, e.g., cash, at a unique, utility based price (e.g. return rate) to one or more creditor-suppliers (hereinafter supplier, bidder, or taker) by a debtor-buyer (hereinafter buyer or maker). Each unique, utility based price (e.g. unique return rate) offered by a corresponding supplier in exchange for early payment by the buyer is based on a variety of factors applicable to the corresponding supplier, such as the corresponding supplier's financial status, condition, or needs. Such factors may include its alternative cost and availability of borrowing, its cash flow, its cash needs, and other factors. Unique in this instance does not necessarily mean each unique, utility based price (e.g. unique return rate) offered by a supplier is necessarily different than each other unique, utility based price offered by each other supplier; rather each unique, utility based price offered by each supplier is selected by the corresponding supplier and belongs to the corresponding supplier based upon the individual status, condition, needs, or other factors of the corresponding supplier.

According to an aspect of the present disclosure, the order system 100 includes one or more buyer client computing devices 102 for one or more debtor-buyers, one or more supplier client computing devices 104 for one or more creditor-suppliers, and one or more server computing devices 106. One or more debtor-buyer (buyer) users may use the buyer client computing devices 102. One or more creditor-supplier (supplier) users may use the supplier client computing devices 104. One or more administrator users may use the one or more server computing devices 106.

The order system 100 further includes one or more market databases 108. The one or more market databases 108 have an organized collection of data. The data in the market databases 108 may have one or more tables including account information (e.g., buyer account and/or business information, supplier account and/or business information), invoice information, cash pool information, inputs information, current offer information, and statistical information (e.g., previous offers, previously filled cash pools), among other information. The invoice information may include unique invoice identifier information (e.g., invoice number 1234). An example of invoice information is shown in the table that follows and optionally may be associated with a particular cash pool. The invoice information may include a unique invoice identifier, a supplier name, a buyer name, a total invoice amount due, and payment terms including a due date and/or a number of days until due.

| Unique Invoice Identifier | Supplier Name | Amount Owed | Date Due |
| --- | --- | --- | --- |
| 1293 | Supplier 1 | $15,000 | Dec. 1, 2014 |
| 1294 | Supplier 1 | $300,000 | Dec. 7, 2014 |
| 1295 | Supplier 1 | $45,000 | Dec. 24, 2014 |
| 1432 | Supplier 2 | $38,000 | Dec. 1, 2014 |
| 1923 | Supplier 2 | $200,000 | Dec. 7, 2014 |
| 1994 | Supplier 2 | $45,000 | Dec. 24, 2014 |

The buyer client computing device 102, the supplier client computing device 104, or another computing device transmits this invoice information to the one or more server computing devices 106 and the invoice information is stored in the one or more market databases 108.

The one or more computing devices communicate and coordinate their actions by passing messages over the communication network 110. The communication network 110 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the order system 100 may be a cloud-based computer system or a distributed computer system.

The buyer client computing device 102, the supplier client computing device 104, or the other computing device optionally executes Enterprise Resource Planning (ERP) software that processes accounts receivable and/or accounts payable resulting from trade debt, e.g., short term trade debt. As an example, the ERP software may be provided by SAP®. Buyers may be debtors who have purchased goods or services from the suppliers and now have accounts payable associated with payment obligations. The invoice information may be associated with homogenous assets or liabilities including, but not limited to: goods, services, payroll obligations, pension obligations, equity instruments, debt obligations, debt instruments, carbon credits, incentives created by government or industry regulation, or other similar assets or liabilities. In other embodiments, the invoice information may be associated with longer-term debt or obligations analogous to debt, such as pension obligations, wage obligations, annuity payments, royalty payments, water rights, electrical utility rights, and rights of way, among others.

The inputs information may include a desired amount of funds or other credit for each buyer account for an auction, e.g., a selected cash pool value, and a desired return rate. The desired return rate may be a desired minimum return rate on the market comprising a particular APR or discount rate. This return rate may be a minimum blended return rate or a blended average return rate that the buyer is willing to accept at a next market clear event or a market closing event that occurs at a particular interval, e.g., each business day at 10:00 am. The offer information may include unique offer identifier information (e.g., OFFER1234ABCD), a desired payment amount for each supplier account, and a maximum return rate that the supplier is willing to offer in exchange for early payment. The return rate may be expressed as an APR, a discount rate, or another value. The return rate may, for example, be based on the supplier's financial status, condition, or needs, such as its alternative cost and availability of borrowing, cash flow, cash needs, and other factors.

The information associated with the order system 100 may be stored in the one or more market databases 108 that comprise a non-relational database and/or a relational database. As an example, the information may be stored in one or more files comprising one or more tables (e.g., a spreadsheet), a relational database management system (RDBMS), an open source distributed database management system such as a Not only SQL (NoSQL) database management system, an in-memory database (IMDB) management system, or another appropriate database management system. As an example, the account information may be stored in a first table, the invoice information may be stored in a second table, the inputs information and the offer information may be stored in a third table, and the statistical information may be stored in a fourth table.

Figure 2:
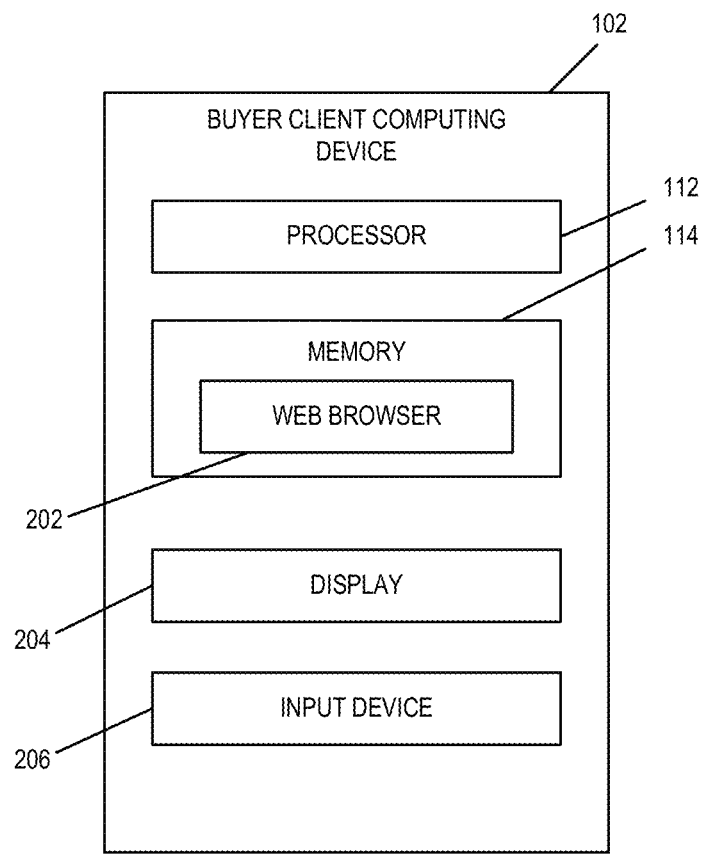
FIG. 2 illustrates a block diagram of a buyer client computing device of the order system according to an example embodiment.

FIGS. 1 and 2 illustrate a block diagram of the buyer client computing device 102 according to an example embodiment. The buyer client computing device 102 may be a computer having a processor 112 and memory 114, such as a laptop, desktop, tablet computer, mobile computing device (e.g., a smartphone), or a dedicated electronic device having a processor and memory. The one or more processors 112 process machine/computer-readable executable instructions and data, and the memory 114 stores machine/computer-readable executable instructions and data including one or more applications, including a web browser 202. The processor 112 and memory 114 are hardware. The memory 114 includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory 114 may also include a dedicated file server having one or more dedicated processors, random access memory (RAM), a Redundant Array of Inexpensive/Independent Disks (RAID) hard drive configuration, and an Ethernet interface or other communication interface, among other components.

The buyer client computing device 102 uses the web browser 202 to transmit data and messages and receive messages, data, and/or resources from the one or more server computing devices 106. The web browser 202 provides a buyer user interface to transmit, submit, or upload one or more invoices representing invoice opportunities each having invoice information, indicate a value for a cash pool or another amount of cash to pay early (e.g., a cash pool of $5,000,000), request a desired return rate (e.g., a minimum blended weighted average APR of 6%), modify the cash pool or other amount of cash to pay early, modify the desired return rate, and respond to offers from suppliers for the amount of cash to pay early, among others. The desired return rate may be an annual percentage rate (APR), a discount rate, or other values.

In order to obtain access to protected resources associated with the server computing device 106, e.g., resources stored in the database 108, the buyer client computing device 102 optionally may transmit a request or other communication, such as with a representation of a username and a password, to the server computing device 106 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The server computing device 106 optionally verifies the username and password and transmits a response or other communication to the buyer client computing device 102 or otherwise grants access to the buyer client computing device to participate in one or more auctions. The server computing device 106 may transmit an HTTP response, an HTTPS response, a LDAP response, a REST response, a SOAP response, and/or another type of response.

The username and password may be encrypted by the buyer client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the server computing device 106 without directly sending the username and password to the server computing device via the communications network 110. The output of the cryptographic hash function is a binary string that may be encoded using Base64.

The web browser 202 may be a component of an application and/or service executable by the buyer client computing device 102. For example, the web browser 202 may be a single unit of deployable executable code. The web browser 202 may be one application and/or a suite of applications. As an example, the web browser 202 may be INTERNET EXPLORER®, SAFARI®, CHROME™, FIREFOX®, OPERA™, or other applications. The web browser 202 may be part of another native application executed by the buyer client computing device 102 (e.g., a web view within the native application) and/or the web browser 202 may be a mobile web browser. According to an example embodiment, the web view may be embedded in a native application or a mobile application (e.g., an app) downloaded from a digital distribution application platform that allows users to browse and download applications developed with mobile software development kits (SDKs) including the App Store and GOOGLE PLAY® among others. The app may be installed on the buyer client computing device 102, which may have the iOS operating system or an ANDROID™ operating system, among other operating systems. The web browser 202 communicates messages to the server computing device 106 and receives messages from the server computing device, e.g., HTTP requests and corresponding HTTP responses. The responses may comprise requested content.

In another example, the buyer client computing device 102 transmits and receives data and other communications to and from the server computing device 106 through mechanisms other than the web browser 202, such as a native application separate from the web browser 202, a user interface generated by an application other than the web browser 202, direct communications, email, text, etc.

The buyer client computing device 102 further includes a display 204 and an input device 206. The display 204 is used to display visual components of the web browser 202, such as at a user interface. In one example, the user interface may display a user interface of the web browser 202, and a representation of the requested resources received from the server computing device 106. The display 204 can include a cathode-ray tube display, a liquid-crystal display, a light-emitting diode display, a touch screen display, and other displays. The input device 206 is used to interact with the web browser 202 or otherwise provide inputs to the buyer client computing device 102 and may include a mouse, a keyboard, a trackpad, and/or the like. The input device 206 may be included within the display 204 if the display is a touch screen display. The input device 206 allows a user of the buyer client computing device 102 to manipulate the user interface of the web browser 202 or otherwise provide inputs to be transmitted to the server computing device 106.

Additionally, the buyer client computing device 102 may include an optional sound device for providing audio output that may be associated with a notification provided by the server computing device 106 and received by the web browser 202 or other user interface or application and an optional vibration motor for providing vibration feedback that may be associated with a notification provided by the server computing device 106 and received by the web browser 202.

The buyer client computing device 102 includes computer readable media (CRM) in memory 114 on which the web browser 202 or other user interface or application is stored. The computer readable media may include volatile media, nonvolatile media, removable media, non-removable media, and/or another available medium that can be accessed by the processor 112. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The web browser 202 may display one or more user interface components received from the one or more server computing devices 106. The user interface components include a setup user interface component for setting up a buyer account for use with the order system 100 and the server computing device 106. According to an example embodiment, the setup user interface component includes a menu for creating an account for use with the order system 100 and editing information associated with the account for use with the order system 100. The web browser 202 transmits the information associated with the account to the server computing device 106 and/or the database 108. As an example, when creating an account for use with the order system 100, the web browser 202 receives account information and transmits the account information to the one or more server computing devices 106. The account information may include username and password information (e.g., username: BigBuyer123, password: secretpassword), name information associated with the account (e.g., a CEO name or buyer account administrator name), address information associated with the account (e.g., 1000 Main Street, Kansas City, Mo.), payment information associated with the account (e.g., (1) a bank account number and a routing number or (2) a credit card number, expiration date, card verification value/card security code), contact information (e.g., one or more email addresses, one or more telephone numbers), days paid early (DPE) information, cash pool information, return rate information, and invoice information. The DPE information, cash pool information, return rate information, and/or invoice information may be added when creating an account and/or after the account is created.

The DPE information may be based on a buyer's payment schedule for paying invoices associated with the marketplace. As an example, the DPE information may indicate that the buyer desires to pay invoices once a week or bi-monthly. The number of days paid early for the invoices may be based on a desired payment date. For example, the buyer may submit as an input or during setup its payment date. The server computing device 106 then calculates the DPE for the buyer for an auction based on the buyer's known payment date. In another aspect, the number of days paid early may be set to a particular value by the buyer for one or more invoices, e.g., ten days before a due date, twenty days before a due date, or another particular number of days before a due date. The DPE information also may indicate that the buyer desires to pay invoices a first number of days early for a first supplier and a second number of days early for a second supplier.

The invoice information may include, information associated with one or more invoices including, for each invoice, an invoice identifier, a supplier name and/or a unique supplier identifier, a buyer name and/or a unique buyer identifier, an invoice amount, payment terms such as a due date or a number of days due and optionally may include information about one or more products or services associated with the invoice including a quantity, a name, a price, and a SKU (stock keeping unit), among other information.

The web browser 202 further displays an invoice receipt user interface component for submitting, transmitting, or uploading information associated with one or more invoices to the server computing device 106. The invoices may be sent automatically individually, using batch processing, or otherwise, and/or may be sent using a manual process. As an example, using the web browser 202, the buyer may setup a process for importing information from the one or more invoices from an ERP system associated with the buyer client computing device 102. An import action may occur at a regular interval, e.g., on a nightly basis at 1:00 am or each morning at 7:00 am. According to an example embodiment, the invoice receipt user interface component receives information associated with the one or more invoices (e.g., an invoice file location including invoice information or an invoice file directory referencing one or more invoice files including invoice information) and the web browser 202 transmits the information associated with the one or more invoices to the one or more server computing devices 106. In one example, the information associated with the one or more invoices may be included in a comma separated value (CSV) file and the CSV file may be uploaded using the web browser 202 via HFITS, SSH (secure shell), and/or FTPS (File Transfer Protocol Secure). In another aspect, the information associated with the one or more invoices may be stored in a spreadsheet or a flat file. In an additional aspect, the information associated with the one or more invoices may be sent via a web application programming interface (API).

In one example, the CSV file may be an eSLAP (Enterprise Summary List of Accounts Payable) file including information associated with one or more invoices. The eSLAP file may have the CSV format and a header line based on Request for Comments (RFC) 4180 comprising a named collection of CSV-delimited rows for importing or exporting by the server computing device 106 and intended for transmission across the communication network 110 and/or storage in memory 114, memory 118, memory 122, or market database 108. The eSLAP file may be created automatically using an export utility or a file generation tool. According to the eSLAP file format, all field names may be case-insensitive and field names may appear in the header in any order. eSLAP files may include user files for adding/editing/removing one or more users associated with the marketplace, an organization file for adding/editing/removing one or more organizations associated with the marketplace, an invoice file for adding/editing/removing one or more invoices associated with the marketplace, and a division file for adding/editing/removing one or more divisions associated with the marketplace.

The user file may include fields, such as email address and company_id (representing the unique identifier for the buyer or supplier). In addition, the user file may include optional fields including division_id (indicates a division for the user using a division unique identifier), first name, last name, phone number, address_1 & address_2, city, country, postal code, state, and status (active—the user is associated with the provided organization, inactive—the user is not associated with the provided organization).

The organization file may include fields, such as company_id (representing the unique identifier for buyer or supplier) and company_name (name for the buyer or supplier). In addition, the organization file may include optional fields including address_1 & address_2, city, country, postal_code, reserve_percentage (percentage of reserve for the division), reserve amount (dollar amount of reserve for this division), reserve invoice priority (due_date_asc—representing due date ascending from shortest DPE to longest DPE—default or due_date_desc—representing due date descending from longest DPE to shortest DPE), reserve_before_adjustments (should invoices be used to cover reserve before they are used to cover adjustments—true or false default), status (active—organization may participate in the market and inactive—organization may not participate in the market), and tax_id (Taxpayer Identification Number or identifiable tax identifier).

The invoice file may include fields, such as amount (transaction amount), currency (currency code as per International Organization for Standardization 4217), house_bank_code (only required for SAP ERP), division_id (indicates organization division), payment_due_date (due date for the payment that may be formatted—YYYY-MM-DD), transaction_type (base transaction or adjustment), company_id (unique identifier for the buyer or supplier), and invoice_id (representing the unique identifier for the invoice). In addition, the invoice file may include optional fields including transaction_date (date the invoice is recorded in the ERP or the date the invoice is received), adj_invoice_id, description (free form text), transaction_status (from ERP), voucher_id (from ERP), and status (eligible for the market, paid and no longer eligible for the market, or deleted and to be removed from the market).

The division file may include fields, such as division_id (unique identifier for the division), company_id (identifier for the organization that the division belongs to), and division_name (name for the division). In addition, the division file may include optional fields including address_1 & address_2, city, country, postal_code, state, reserve_percentage (percentage of reserve for this division), reserve_amount (dollar amount of reserve for this division), reserve_invoice_priority (due_date_asc—representing due date ascending from shortest DPE to longest DPE—default or due_date_desc—representing due date descending from longest DPE to shortest DPE), reserve_before_adjustments (should invoices be used to cover reserve before they are used to cover adjustments—true or false default), status (active—division is actively associated with the provided organization or inactive—the division is not actively associated with the provided organization), and tax_id (Taxpayer Identification Number or the identifiable tax identifier).

The eSLAP files may be encrypted by the web browser 202 prior to transmission using a public key and decrypted by a private key used by the one or more server computing devices 106. The one or more server computing devices 106 may decrypt the eSLAP files, parse the eSLAP files, and store the information associated with the one or more invoices in the memory 122 and/or the database 108.

The web browser 202 further displays a buyer return user interface component for receiving information associated with a total amount to pay early (e.g., a cash pool value) and a desired return rate for the one or more invoices. As an example, the cash pool may be set at $1,000,000 and the desired return may be set at 5% APR. Additionally, the buyer return user interface component may request a minimum APR for accepting an invoice (e.g., 1%), a minimum income per invoice (e.g., $1.00), a cash pool replenishment period (e.g., daily, weekly), a reserve setting percentage (e.g., 15%), and pay dates (e.g., Tuesday, Thursday), among other information.

The web browser 202 further displays a buyer user interface component for receiving information associated with income and a return from the one or more invoices (e.g., a percentage of the cash pool used, an amount of the cash pool distributed, a total amount saved (return amount) and/or a return rate saved for paying the one or more invoices early), a payment user interface component for receiving marketplace fees for placing the one or more invoices on the marketplace, and payment for the inputs of the one or more invoices from the server computing device 106 and/or other computing devices. As an example, using the web browser 202, the buyer may setup a process for receiving income and return information associated with the one or more invoices into the ERP system associated with the buyer client computing device 102. An import action may occur at a regular interval, e.g., on a nightly basis at 1:00 am or in the morning at 7:00 am.

The web browser 202 receives responses and communications from the one or more server computing devices 106 and provides a representation of requested information and user interface elements to the buyer client computing device 102 for display on the display 204. As an example, the web browser 202 generates a web-based graphical user interface (GUI) that accepts input and provides output by incorporating received web content that is transmitted via the communication network 110 and viewed by a user of the buyer client computing device 102. The web browser 202 may provide realtime automatically and dynamically refreshed information to the user of the studio client computing device 102 using Java, Javascript, AJAX (Asynchronous Javascript and XML), ASP.NET, Microsoft .NET, and/or node.js, among others. The web browser 202 may send data to the server computing device 106, and retrieve data from the server computing device 106 asynchronously without interfering with the display and behavior of the web page displayed on the buyer client computing device 102. As an example, data may be retrieved using XMLHttpRequest objects or using the WebSocket Protocol disclosed in RFC 6455.

Figure 3:
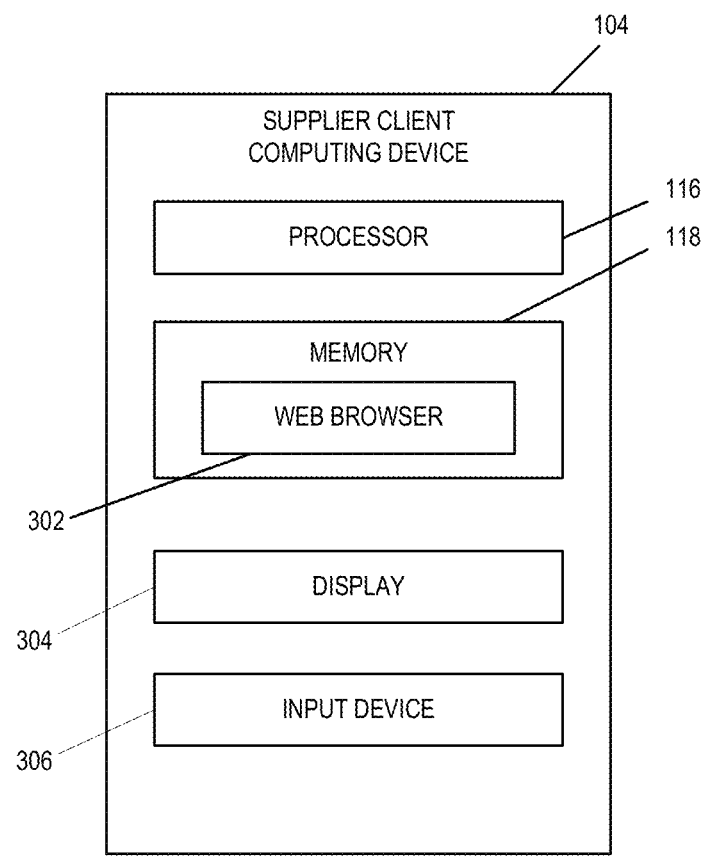
FIG. 3 illustrates a block diagram of a supplier client computing device of the order system according to an example embodiment.

FIGS. 1 and 3 illustrate a block diagram of the supplier client computing device 104 according to an example embodiment. The supplier client computing device 104 may be a computer having a processor 116 and memory 118, such as a laptop, desktop, tablet computer, mobile computing device (e.g., a smartphone), or a dedicated electronic device having a processor and memory. The one or more processors 116 process machine/computer-readable executable instructions and data, and the memory 118 stores machine/computer-readable executable instructions and data including one or more applications, including a web browser 302. The processor 116 and memory 118 are hardware. The memory 118 includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory 118 may also include a dedicated file server having one or more dedicated processors, random access memory (RAM), a Redundant Array of Inexpensive/Independent Disks (RAID) hard drive configuration, and an Ethernet interface or other communication interface, among other components.

The supplier client computing device 104 uses the web browser 302 to submit one or more offers on invoices or other credits associated with one or more cash pools associated with buyers. Each of the one or more offers may have a maximum APR or discount rate percentage (e.g., 5% APR) that the supplier is willing to offer in exchange for early payment.

In order to obtain access to protected resources associated with the server computing device 106, e.g., resources stored in the database 108, the supplier client computing device 104 may transmit a request or other communication, such as with a representation of a username and a password, to the server computing device 106 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The server computing device 106 optionally verifies the username and password and transmits a response or other communication to the supplier client computing device 104 or otherwise grants access to the supplier client computing device to participate in one or more auctions. The server computing device 106 may transmit an HTTP response, an HTTPS response, a LDAP response, a REST response, a SOAP response, and/or another type of response.

The username and password may be encrypted by the supplier client computing device 104 using transport layer security (TLS), secure sockets layer (SSL) and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the server computing device 106 without directly sending the username and password to the server computing device via the communications network 110. The output of the cryptographic hash function is a binary string that may be encoded using Base64.

The web browser 302 may be a component of an application and/or service executable by the supplier client computing device 104. For example, the web browser 302 may be a single unit of deployable executable code. The web browser 302 may be one application and/or a suite of applications. As an example, the web browser 302 may be INTERNET EXPLORER®, SAFARI®, CHROME™, FIREFOX®, OPERA™, or other applications. The web browser 302 may be part of another native application executed by the supplier client computing device 104 (e.g., a web view within the native application) and/or the web browser may be a mobile web browser. According to an example embodiment, the web view may be embedded in a native application or a mobile application (e.g., an app) downloaded from a digital distribution application platform that allows users to browse and download applications developed with mobile software development kits (SDKs) including the App Store and GOOGLE PLAY® among others. The app may be installed on the supplier client computing device 104, which may have the iOS operating system or an ANDROID™ operating system, among other operating systems. The web browser 302 communicates messages to the server computing device 106 and receives messages from the server computing device 106, e.g., HTTP requests and corresponding HTTP responses.

In another example, the supplier client computing device 104 transmits and receives data and other communications to and from the server computing device 106 through mechanisms other than the web browser 302, such as a native application separate from the web browser 302, a user interface generated by an application other than the web browser 302, direct communications, email, text, etc.

The supplier client computing device 104 further includes a display 304 and an input device 306. The display 304 is used to display visual components of the web browser 302, such as at a user interface. In one example, the user interface may display a user interface of the web browser 302, and a representation of the requested resources received from the server computing device 106. The display 304 can include a cathode-ray tube display, a liquid-crystal display, a light-emitting diode display, a touch screen display, and other displays. The input device 306 is used to interact with the web browser 302 or otherwise provide inputs to the supplier client computing device 104 and may include a mouse, a keyboard, a trackpad, and/or the like. The input device 306 may be included within the display 304 if the display is a touch screen display. The input device 306 allows a user of the supplier client computing device 104 to manipulate the user interface of the web browser 302 or otherwise provide inputs to be transmitted to the server computing device 106.

Additionally, the supplier client computing device 104 may include an optional sound device for providing audio output that may be associated with a notification provided by the server computing device 106 and received by the web browser 302 or other user interface and an optional vibration motor for providing vibration feedback that may be associated with a notification provided by the server computing device 106 and received by the web browser 302.

The supplier client computing device 104 includes computer readable media (CRM) in memory 118 on which the web browser 302 or other user interface or application is stored. The computer readable media may include volatile media, nonvolatile media, removable media, non-removable media, and/or another available medium that can be accessed by the processor 116. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The web browser 302 may display one or more user interface components received from the one or more server computing devices 106. The one or more user interface components may include a setup user interface component for setting up a supplier account for use with the order system 100 and the server computing device 106. According to an example embodiment, the setup user interface component provides an interface and/or a menu for creating an account for use with the order system 100 and editing information associated with the account for use with the order system 100. The web browser 302 receives account information associated with the account and transmits the account information to the server computing device 106 and/or the database 108. As an example, when creating an account for use with the order system 100, the setup user interface component may request username and password information (e.g., username: SupplierUser, password: $ecret), name information (e.g., a CEO name or a supplier administrator name), address information (e.g., 100 Warehouse Ave. Kansas City, Mo.), payment information (e.g., (1) a bank account number and a routing number or (2) a credit card number, expiration date, card verification value/card security code), contact information (e.g., one or more email addresses, one or more telephone numbers), and offer information, among other information. The offer information may include one or more offers each associated with a particular invoice and having an APR or a discount percentage that the supplier is willing to offer in exchange for early payment. The offer information may be provided when creating an account and/or after creating an account.

The web browser 302 further displays an accounts receivable user interface component. The accounts receivable user interface component receives input information from a supplier user associated with one or more accounts receivable and/or information from the server computing device 106 regarding the invoice opportunities from the one or more buyers. The accounts receivable user interface component receives information associated with invoice opportunities from one or more buyers and the accounts receivable user interface component displays the invoice opportunities from the one or more buyers. As an example, the supplier user may select one or more of the available invoice opportunities and place an offer on the one or more of the available invoice opportunities.

Once the accounts receivable user interface component receives the input from the supplier user, the web browser 302 transmits information associated with the accounts receivables to the server computing device 106. The server computing device 106 receives the information associated with the accounts receivables and stores the information associated with the accounts receivables in the database 108 and/or in other locations.

The web browser 302 further displays an offer receipt user interface component for placing one or more offers based on one or more associated invoices for the supplier user and an offer return rate (e.g., APR, discount rate, or amount) that the supplier is willing to offer in exchange for early payment. As an example, the supplier user may set an offer of 7% APR for the one or more associated invoices for the supplier user. The offer return rate may, for example, be based on the supplier's financial status, condition, or needs, such as its alternative cost and availability of borrowing, cash flow, cash needs, and other factors.

The web browser 302 further displays a supplier delivery user interface component for receiving information from the server computing device 106 associated with one or more offers placed by the supplier user, a payment user interface component for displaying information associated with fee information transmitted by the server computing device 106 to the web browser 302 associated with the one or more offers and displaying payment information associated with the one or more offers transmitted by the server computing device 106 and/or other computing devices.

The web browser 302 receives responses or other communications from the one or more server computing devices 106 and provides a representation of requested information and user interface elements to the supplier client computing device 104 for display on the display 304. As an example, the web browser 302 displays a web-based graphical user interface (GUI) that accepts input and provides output by incorporating received content that is transmitted via the communication network 110 and viewed by a user of the supplier client computing device 104. The web browser 302 may provide realtime automatically and dynamically refreshed information to the user of the supplier client computing device 104 using Java, Javascript, AJAX (Asynchronous Javascript and XML), ASP.NET, Microsoft .NET, and/or node.js, among others. The web browser 302 may send data to the server computing device 106, and retrieve data from the server computing device 106 asynchronously without interfering with the display and behavior of the web page displayed on the display 304 of the supplier client computing device 104. As an example, data may be retrieved using XMLHttpRequest objects or using WebSocket.

Figure 4:
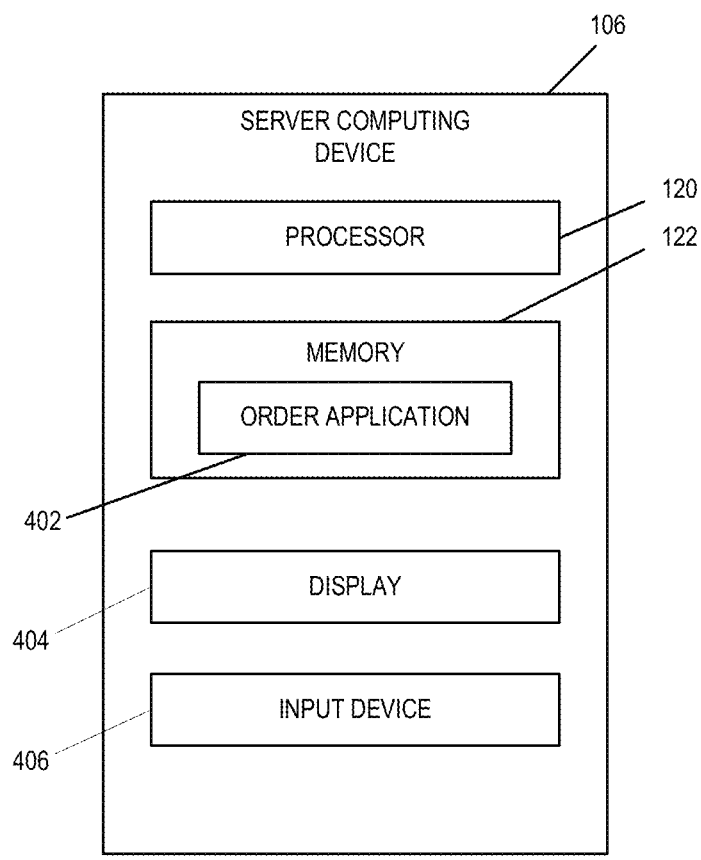
FIG. 4 illustrates a block diagram of a server computing device of the order system according to an example embodiment.

FIGS. 1 and 4 illustrate a block diagram of the server computing device 106 according to an example embodiment. The server computing device 106 may be a computer having a processor 120 and memory 122, such as a server, laptop, desktop, tablet computer, mobile computing device (e.g., a smartphone), or a dedicated electronic device having a processor and memory. The one or more processors 120 process machine/computer-readable executable instructions and data, and the memory 122 stores machine/computer-readable executable instructions and data including one or more applications, including an order application 402. The processor 120 and memory 122 are hardware. The memory 122 includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory 122 may also include a dedicated file server having one or more dedicated processors, random access memory (RAM), a Redundant Array of Inexpensive/Independent Disks (RAID) hard drive configuration, and an Ethernet interface or other communication interface, among other components.

The order application 402 conducts an auction for a market in which the order application 402 matches one or more invoices from one or more debtor-buyers to pay accounts payable or some other debt obligation to one or more offers from one or more creditor-suppliers to provide a return rate for an amount of its accounts receivable or other credit to be paid early. The buyer may submit as an input or during auction setup its payment date for the one or more invoices. The order application 402 then calculates the DPE for the buyer for an auction based on the buyer's known payment date. An auction is an event in which the invoices and the offers are matched. The auction optionally has an opening in which debtor-buyer invoices are received and creditor-supplier offers can be continually received until the auction is closed. Alternately, there may be no specific opening. The auction closing is the point where the invoices and offers are matched, the auction is ended, and funds from one or more cash pools associated with the invoices from the debtor-buyers are allocated to one or matching creditor-supplier offers. The order application 402 then transmits information to the one or more debtor-buyers identifying the matching (winning) offers, such as amount(s), return rate, saved amount, DPE, and any identifying information (e.g., invoice identifiers). The order application 402 optionally transmits information to the creditor-suppliers with the matching (winning) offers identifying the accepted amount(s), return rate, discount amount, DPE, and any identifying information (e.g., invoice identifiers) for the amounts.

In one aspect, the order application 402 comprises a web server for responding to requests or other communications from the one or more buyer client computing devices 102 and the one or more supplier client computing devices 104. As an example, the order application 402 may receive a request to place one or more invoices on the market. In response to receiving this request, the order application 402 may send a message or communication to one or more supplier client computing devices 104 to inform users of the new one or more invoice opportunities placed on the market.

The server computing device 106 may further include an optional display 404 and an optional input device 406. The display 404 displays visual components of the order application 402, such as at a user interface, if applicable. In one example, the user interface may display user information of the order application 402, and a representation of one or more current invoice opportunities associated with the order system 100. The display 404 also may display statistical or analytical information associated with current and past invoices and current and past offers. The display 404 can include a cathode-ray tube display, liquid crystal display, a light-emitting diode display, a touch screen display, and other displays. The input device 406 is used to interact with the order application 402 and may include a mouse, a keyboard, a trackpad, and/or the like. The input device 406 may be included within the display 404 if the display is a touch screen display. The input device 406 allows a user of the server computing device 106 to manipulate the user interface of the order application 402.

Figure 5:
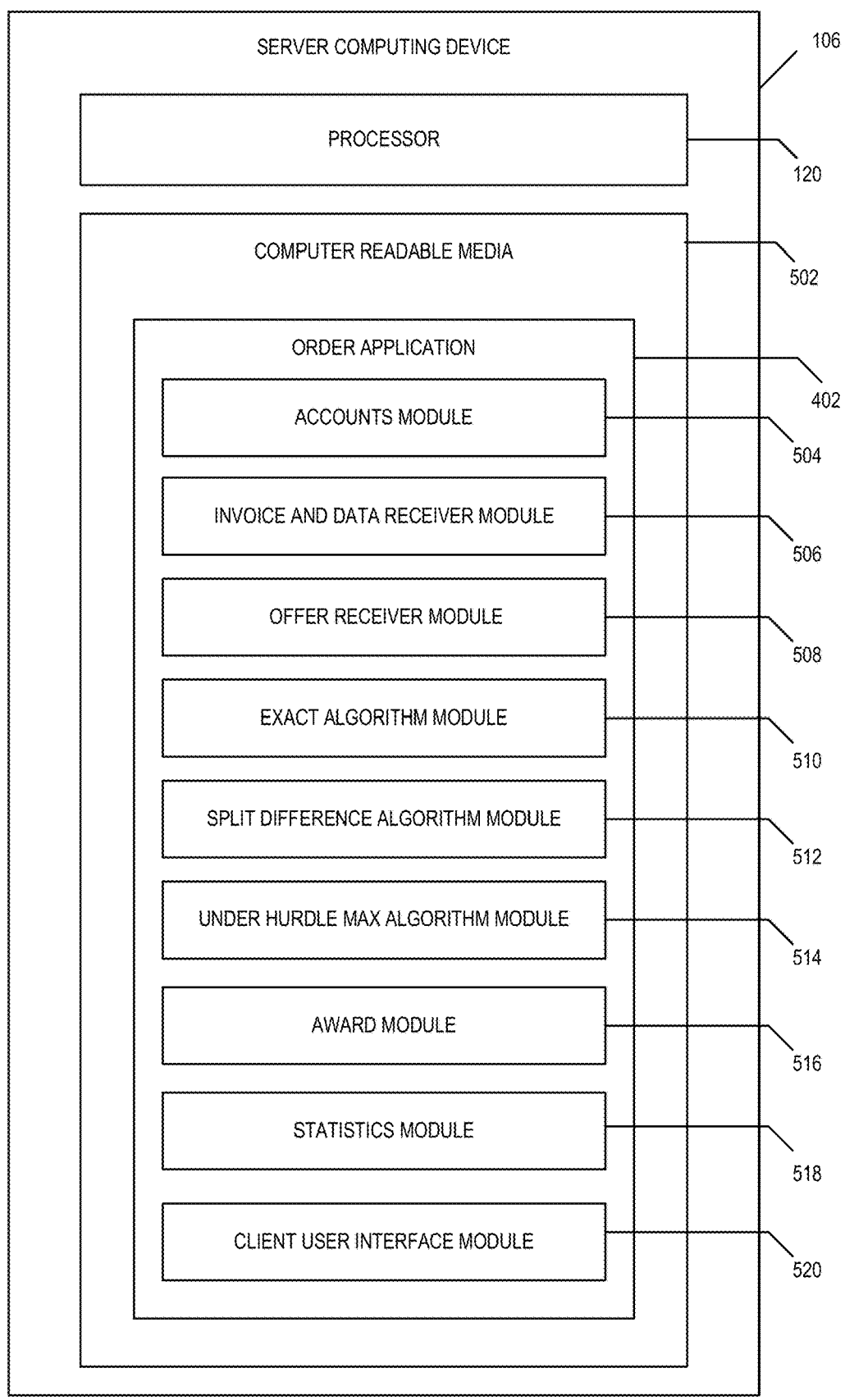
FIG. 5 illustrates a block diagram of an order application of the server computing device according to an example embodiment.

FIG. 5 illustrates a block diagram of the order application 402 of the server computing device 106 according to an example embodiment. The server computing device 106 includes computer readable media (CRM) 502 in memory 122 on which the order application 402 is stored. The computer readable media 502 may include volatile media, nonvolatile media, removable media, non-removable media, and/or another available medium that can be accessed by the processor 120. By way of example and not limitation, the computer readable media 502 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The order application 402 includes an accounts module 504 for receiving and storing information associated with accounts for using the order system 100. The accounts include buyer user accounts, supplier user accounts, and administrator accounts. The information associated with the accounts may include username and password information, address information, payment information, contact information, invoice information, offer information, and/or administrator information, among other information. The accounts module 504 stores the information in the database 108 and/or the memory 122.

The order application 402 further includes an invoice and data receiver module 506 for receiving one or more invoices having invoice information, a desired cash pool to pay early, and a minimum return from a buyer client computing device 102. In one aspect, the invoice and data receiver module 506 may receive as an input or during auction setup its payment date for the one or more invoices. The invoice and data receiver module 506 then calculates the DPE on each of the individual invoices for an auction based on the buyer's known payment date. The invoice information associated with each invoice may include a supplier name or a supplier unique identifier, a time to pay early (e.g., days paid early (DPE)), an original invoice amount, a list of products/services, and other information. The invoice information associated with one or more invoices may be received by the invoice and data receiver module 506 as a CSV file and/or an eSLAP file, and/or another format. The invoice and data receiver module 506 receives information associated with the one or more invoices and stores the information associated with the one or more invoices in the database 108 and/or the memory 122.

In one example, there may be a fee for placing the one or more invoices on the marketplace. As another example, there may be a fee for finalizing or consummating payment of the one or more invoices through the marketplace. As an additional example, the fee may be a percentage of the invoice. As another example, the fee may be a fixed fee. As an even further example, the fee may be a percentage of the amount for early payment or a percentage of the income derived from the desired return. The order application 402 stores the fee information in the one or more marketplace databases 108.

The order application 402 further includes an offer receiver module 508 for receiving one or more offers from one or more supplier client computing devices 104 for the one or more invoices, AP, or other credit/debt, and the cash pools available on the market. The AP, invoices, or other debt obligation for early payment within the available cash pool for each buyer may be fulfilled using one or more offers from the supplier users having at least one associated invoice, associated AR, or associated credit. Each offer may include the APR, discount rate, or other discount amount that the supplier is willing to pay to receive the early payment of the determined amount at the time to pay early. The APR, discount rate, or discount amount may represent a maximum APR, a maximum discount, or maximum amount that the supplier is willing to pay to receive the early payment of the determined amount at the time to pay early. The offer may be received by the offer receiver module 508 in response to a communication sent by the offer receiver module 508.

In a first aspect, before receiving the offer, the offer receiver module 508 may determine a list of one or more currently available invoices and/or cash pools and information associated with each of the one or more currently available invoices and/or cash pools.

In another aspect, before receiving the offer, the offer receiver module 508 may receive a request from the supplier client computing device 104 for a list of one or more currently available invoices and/or cash pools. However, the offer receiver module 508 does not have to receive any requests from the supplier client computing devices 104. The offer receiver module 508 transmits information associated with the one or more currently available invoices and/or cash pools to the supplier client computing device 104. The information may be sent in response to the request and/or may be pushed to the supplier client computing device 104.

According to an example embodiment, the offer receiver module 508 may sort the list of one or more currently available invoices and/or cash pools according to a particular variable. In another example, the offer receiver module 508 may provide each supplier user a list of one or more invoices and/or cash pools sorted according to a particular variable. As an example, the variable may be one or more of invoice opportunities ending first, invoice opportunities ending last, invoice opportunity need-by date, invoice type, location, price, popular buyer user, favorite buyer user, highest rated buyer user, product category, product popularity, highest return, lowest return, highest DPE, lowest DPE, and other variables.

In an additional aspect, the offer receiver module 508 may send a communication including information about a new and/or desirable invoice opportunity to one or more supplier users. The communication may be an email, a text message, a push notification, and other types of messages.

The offer receiver module 508 queries the database 108 for one or more potential supplier recipients that may be interested in the invoice opportunity and notifies one or more supplier client computing devices 104 of the invoice opportunity. The offer receiver module 508 determines the one or more potential user recipients based on setup information, invoice information, buyer information, CSV or eSLAP information, past offers, past invoices, and/or other information. The information in the communication may include one or more of a start date/time of the invoice opportunity, a need-by date/time for the invoice opportunity, an ending time of the invoice opportunity, a possible return rate (APR, discount rate, and/or cash amount) associated with the invoice opportunity, an associated buyer user, one or more associated homogenous assets and liabilities, a quantity of homogenous assets and liabilities, a representation of a current blended average offer return, and/or homogenous assets and liabilities information such as a name, a SKU, etc.

After sending information associated with one or more invoices available on the market to the supplier client computing device 104, the offer receiver module 508 receives the one or more offers from the supplier client computing device 104. In an additional aspect, after the offer is received, the offer receiver module 508 may send a first communication including information confirming that the offer is received, and may send additional communications including information about being outbid or a warning about potentially being outbid to one or more user recipients including a new current offer value, e.g., a current APR or discount rate. The communication may be an email, a text message, a push notification, and other types of messages.

The order application 402 executes at least one of an exact algorithm module 510, a split difference algorithm module 512, and an under hurdle max algorithm module 514. The order application 402 may execute one or more of the algorithm modules 510, 512, or 514. In one aspect, the order application 402 selects which algorithm to execute to fill a cash pool either before or after executing the algorithms. In another aspect, the order application 402 receives a selection of one or more algorithms from an administrator user.

The order application 402 includes the exact algorithm module 510 that determines how to distribute a cash pool allocated by a buyer to the one or more suppliers for the buyer that choose to participate in an auction provided by the dynamic marketplace. Each discrete buyer of a plurality of buyers having a unique cash flow situation receives a disparate, utility based return rate for early payment of accounts payable or another debt obligation and each discrete supplier of a plurality of suppliers having a unique cash flow situation receives an early payment of accounts receivable or another credit based on a disparate, utility based return rate given to a buyer.

According to one aspect, the order application 402 executes the exact algorithm module 510. The exact algorithm module 510 receives a desired return amount and a cash pool amount from the buyer client computing device 102, e.g., 12% APR and $74,000. In one example, the exact algorithm module 510 optionally utilizes one or more of a minimum APR acceptable, e.g., 2%, a minimum earn acceptable, e.g., $0.01, and a minimum invoice amount, e.g., $1.00. Before executing the exact algorithm, the exact algorithm module 510 receives data associated with one or more invoices and offers for the one or more invoices. The exact algorithm module 510 evaluates data for a list of one or more available invoices provided by a buyer and associated with the cash pool. The exact algorithm module 510 also evaluates one or more offers from one or more suppliers, each having a particular APR or a discount percentage that the supplier is willing to accept in exchange for early payment. An example list of the one or more available invoices with one or more offers is shown below.

| Supplier | Days Paid Early (DPE) | Invoice Amount | Supplier Offer Type | Supplier Offer |
|---|---|---|---|---|
| A | 3 | 10000 | APR | 9% |
| A | 4 | 12000 | APR | 9% |
| B | 10 | 11000 | APR | 12% |
| B | 22 | 1000 | APR | 12% |
| C | 35 | 5000 | APR | 6% |
| D | 40 | 6000 | APR | 4% |
| E | 65 | 20000 | APR | 13% |
| F | 40 | 10000 | Discount | 1% |
| F | 20 | 20000 | Discount | 1% |

Next, the exact algorithm module 510 calculates a maximum discount percentage, a maximum APR percentage, and a maximum earn for each of the one or more available invoices. The maximum earn is based on the following equation: invoice amount*APR/360*days paid early. In other words, maximum earn is equal to a maximum amount of money the buyer will earn from paying the corresponding invoice at the offered APR or discount for the offered DPE.

| Supplier | Days Paid Early (DPE) | Invoice Amount | Supplier Offer Type | Supplier Offer | Max Discount | Max APR | Max Earn |
|---|---|---|---|---|---|---|---|
| A | 3 | 10000 | APR | 9% | 0.075% | 9% | $7.50 |
| A | 4 | 12000 | APR | 9% | 0.1% | 9% | $12.00 |
| B | 10 | 11000 | APR | 12% | 0.3333333% | 12% | $36.66 |
| B | 22 | 1000 | APR | 12% | 0.7333333% | 6% | $7.33 |
| C | 35 | 5000 | APR | 6% | 0.5833333% | 4% | $29.16 |
| D | 40 | 6000 | APR | 4% | 0.44444% | 13% | $26.67 |
| E | 65 | 20000 | APR | 13% | 2.34722% | 9% | $469.44 |
| F | 40 | 10000 | Discount | 1% | 1% | 9% | $100 |
| F | 20 | 20000 | Discount | 1% | 1% | 18% | $200 |

After calculating the maximum discount percentage, the maximum APR, and the maximum earn, the exact algorithm module 510 filters any ineligible invoices from the list of the one or more available invoices. Invoices may be determined to be ineligible based on the minimum APR acceptable, the minimum earn acceptable, and the minimum invoice amount. In this example, none of the invoices are determined to be ineligible.

Next, the exact algorithm module 510 priority sorts the one or more available invoices based on one or more of a maximum APR, days paid early (DPE), and invoice amount. In other words, the exact algorithm module 510 uses at least one of the maximum APR, DPE, and invoice amount to sort the one or more invoices. In a first approach, the exact algorithm module 510 may optimize around a longer DPE. In another approach, the exact algorithm module 510 may optimize around a larger discount amount. In another approach, the exact algorithm module 510 may optimize around higher APRs. In another example, the exact algorithm module 510 may optimize around a longer DPE, then a larger discount amount, and then around higher APRs. The exact algorithm module 510 can use one, two, or more factors for optimization. The exact algorithm module 510 may take other factors into account when sorting the one or more available invoices. In the table below, the invoices are sorted by max APR.

| Supplier | Days Paid Early (DPE) | Invoice Amount | Supplier Offer Type | Supplier Offer | Max Discount | Max APR | Max Earn |
|---|---|---|---|---|---|---|---|
| F | 20 | 20000 | Discount | 1% | 1% | 18% | $200.00 |
| E | 65 | 20000 | APR | 13% | 2.34722% | 13% | $469.44 |
| B | 22 | 1000 | APR | 12% | 0.7333333% | 12% | $7.33 |
| B | 10 | 11000 | APR | 12% | 0.3333333% | 12% | $36.66 |
| F | 40 | 10000 | Discount | 1% | 1% | 9% | $100.00 |
| A | 4 | 12000 | APR | 9% | 0.1% | 9% | $12.00 |
| A | 3 | 10000 | APR | 9% | 0.075% | 9% | $7.50 |
| C | 35 | 5000 | APR | 6% | 0.5833333% | 6% | $29.16 |
| D | 40 | 6000 | APR | 4% | 0.44444% | 4% | $26.67 |

The exact algorithm module 510 determines a total weighted average APR for the total amount of invoices based on the sorted list of the one or more available invoices. In this case, the weighted average APR for the invoices is the total weighted APR amount (all weighted APR amounts added together) divided by the total invoice amounts (all invoice amounts added together)=11060/95000=11.642%. The exact algorithm module 510 also determines a weighted APR for each invoice (invoice weighted APR), which is equal to the invoice amount times the offer APR for the invoice.

| Supplier | Days Paid Early (DPE) | Inv. Amt | Offer Type | Supplier Offer | Max Discount | Max APR | Max Earn | Inv. Weighted APR = APR * INV AMT |
|---|---|---|---|---|---|---|---|---|
| F | 20 | 20000 | Discount | 1% | 1% | 18% | $200.00 | 3600 |
| E | 65 | 20000 | APR | 13% | 2.34722% | 13% | $469.44 | 2600 |
| B | 22 | 1000 | APR | 12% | 0.7333333% | 12% | $7.33 | 120 |
| B | 10 | 11000 | APR | 12% | 0.3333333 | 12% | $36.66 | 1320 |
| F | 40 | 10000 | Discount | 1% | 1% | 9% | $100.00 | 900 |
| A | 4 | 12000 | APR | 9% | 0.1% | 9% | $12.00 | 1080 |
| A | 3 | 10000 | APR | 9% | 0.075% | 9% | $7.50 | 900 |
| C | 35 | 5000 | APR | 6% | 0.5833333 | 6% | $29.16 | 300 |
| D | 40 | 6000 | APR | 4% | 0.44444% | 4% | $26.67 | 240 |
| TOTAL | | 95000 | | | | | | 11060 |

11.642% is less than the desired return rate of 12%. As a result, the exact algorithm module 510 iteratively removes one or more of the lowest ranked invoices and recalculates the weighted average APR until the weighted average APR is at or above the desired return rate. In this example, the invoice to supplier D for $6,000 is removed.

| F | 20 | 20000 | Discount | 1% | 1% | 18% | $200.00 | 3600 |
|---|---|---|---|---|---|---|---|---|
| E | 65 | 20000 | APR | 13% | 2.34722% | 13% | $469.44 | 2600 |
| B | 22 | 1000 | APR | 12% | 0.7333333% | 12% | $7.33 | 120 |
| B | 10 | 11000 | APR | 12% | 0.3333333% | 12% | $36.66 | 1320 |
| F | 40 | 10000 | Discount | 1% | 1% | 9% | $100.00 | 900 |
| A | 4 | 12000 | APR | 9% | 0.1% | 9% | $12.00 | 1080 |
| A | 3 | 10000 | APR | 9% | 0.075% | 9% | $7.50 | 900 |
| C | 35 | 5000 | APR | 6% | 0.5833333% | 6% | $29.16 | 300 |
| D | 40 | 6000 | APR | 4% | 0.44444% | 4% | $26.67 | 240 |
| TOTAL | | 89000 | | | | | | 10820 |

After removing the lowest ranked invoice to supplier D, the new weighted average APR=10820/89000=12.1573%. This exceeds the desired return rate of 12%. The new weighted average APR exceeds the desired return rate, but removing another invoice would not result in exactly the desired return rate of 12%. The exact algorithm module 510 determines an exact algorithm ratio equal to the desired return rate divided by the weighted average APR. In this example, the exact algorithm module 510 determines an exact algorithm ratio based on the weighted average APR and the desired return amount=12/12.1573=0.987061. The exact algorithm module 510 applies the determined exact algorithm ratio to the invoice information for each of the one or more invoices in the list of invoices, including the discount, APR, earn, and invoice amount. This becomes the revised offer.

| Exact Ratio | Revised Offer Discount | Revised Offer APR | Revised Offer Earn | New Invoice Amount |
|---|---|---|---|---|
| .987061 | 0.99% | 17.77% | $197.41 | $19,802.59 |
| .987061 | 2.32% | 12.83% | $463.37 | $19,536.63 |
| .987061 | 0.72% | 11.84% | $7.24 | $992.76 |
| .987061 | 0.33% | 11.84% | $36.19 | $10,963.81 |
| .987061 | 0.99% | 8.88% | $98.71 | $9,901.29 |
| .987061 | 0.10% | 8.88% | $11.84 | $11,988.16 |
| .987061 | 0.07% | 8.88% | $7.40 | $9,992.60 |
| .987061 | 0.58% | 5.92% | $28.78 | $4,971.22 |

After the revised offers are determined, the exact algorithm module 510 sorts the list of the one or more invoices by one or more of a revised offer APR that is based on the maximum APR and the exact algorithm ratio, a revised offer discount and then a new invoice amount. The exact algorithm module 510 may take other factors into account when sorting the one or more invoices.

After sorting the invoices, some of the one or more invoices are selected based on the new invoice amount by iterating through the one or more invoices. If the running cash total equal to the sum of one or more new invoice amounts is less than the cash pool and the calculated weighted APR is greater than the desired APR, then an invoice is selected. If the running cash total is greater than the cash pool, the invoice is skipped. If the running cash total is less than the cash pool and the calculated weighted APR is less than the desired APR, the APR is raised up the maximum for the offer. At this point, the exact algorithm module 510 redetermines whether the offer is eligible for acceptance. Otherwise, the invoice is skipped.

The exact algorithm module 510 determines the buyer finalized return rate, one or more supplier finalized offers, a new invoice total amount for the one or more selected invoices, and an invoice discount amount for the one or more selected winning invoices. In this case, the exact algorithm module 510 provides the buyer with an awarded amount of nearly $74,000 (sum of new invoice amount) and a return of 12% APR by selecting the invoices shown below. The invoices shown below are the invoices that "win" and are selected when the market closes. In one embodiment, the market closes each business day at a particular time.

| Supplier | Exact Ratio | Revised Offer Discount | Revised Offer APR | Revised Offer Earn | New Invoice Amount |
|---|---|---|---|---|---|
| F | .987061 | 0.99% | 17.77% | $197.41 | $19,802.59 |
| E | .987061 | 2.32% | 12.83% | $463.37 | $19,536.63 |

-continued

| Supplier | Exact Ratio | Revised Offer Discount | Revised Offer APR | Revised Offer Earn | New Invoice Amount |
|---|---|---|---|---|---|
| B | .987061 | 0.72% | 11.84% | $7.24 | $992.76 |
| B | .987061 | 0.33% | 11.84% | $36.19 | $10,963.81 |
| F | .987061 | 0.99% | 8.88% | $98.71 | $9,901.29 |
| A | .987061 | 0.10% | 8.88% | $11.84 | $11,988.16 |

The order application 402 includes the split difference algorithm module 512 that determines how to allocate all or a portion of a cash pool for a buyer to achieve a desired return in exchange for early payment of AP or other debt obligation to the one or more suppliers that choose to participate in an auction provided by the dynamic marketplace. In addition, the split difference algorithm module 512 splits, or divides, any extra amount (APR, discount, or otherwise) beyond the buyer's desired return between the buyer and the one or more suppliers for the buyer.

According to one aspect, the order application 402 executes the split difference algorithm module 512. The split difference algorithm module 512 receives a desired return rate and a cash pool amount from the buyer client computing device 102, e.g., 12% APR and $62,000. In addition, the split difference algorithm module 512 optionally utilizes a minimum APR acceptable, e.g., 2%, a minimum earn acceptable, e.g., $0.01, and a minimum invoice amount, e.g., $1.00. Before executing the split difference algorithm, the split difference algorithm module 512 receives data associated with one or more invoices and offers for the one or more invoices. The split difference algorithm module 512 evaluates data for a list of one or more available invoices provided by a buyer and associated with the cash pool. The split difference algorithm module 512 also evaluates one or more offers from one or more suppliers, each having a particular APR or a discount percentage that the supplier is willing to accept in exchange for early payment. An example list of the one or more available invoices and offers is shown below.

| Supplier | Days Paid Early (DPE) | Invoice Amount | Supplier Offer Type | Supplier Rate Offer |
|---|---|---|---|---|
| A | 3 | 10000 | APR | 9% |
| A | 4 | 12000 | APR | 9% |
| B | 10 | 11000 | APR | 12% |
| B | 22 | 1000 | APR | 12% |
| C | 35 | 5000 | APR | 6% |
| D | 40 | 6000 | APR | 4% |
| E | 65 | 20000 | APR | 13% |
| F | 40 | 10000 | Discount | 1% |
| F | 20 | 20000 | Discount | 1% |

The split difference algorithm module 512 receives a split difference percentage from an administrator. As an example, the split difference may be 50%, 40%, or another value. If the split difference is 50%, then the extra amount (e.g., APR or discount) beyond the desired return is evenly distributed between the buyer and the one or more suppliers. If the split difference is 60%, then 60% of the extra amount beyond the desired return is distributed to the buyer and 40% of the extra amount beyond the desired return is distributed to the one or more suppliers. If the split difference is 40%, then 40% of the extra amount beyond the desired return is distributed to the buyer and 60% of the extra amount beyond the desired return is distributed to the one or more suppliers. Next, the split difference algorithm module 512 calculates a maximum discount percentage, a maximum APR, and a maximum earn for each of the one or more available invoices.

| Supplier | Days Paid Early (DPE) | Invoice Amount | Supplier Offer Type | Supplier Rate Offer | Max Discount | Max APR | Max Earn |
|---|---|---|---|---|---|---|---|
| A | 3 | 10000 | APR. | 9% | 0.075% | 9% | $7.50 |
| A | 4 | 12000 | APR | 9% | 0.1% | 9% | $1.2.00 |
| B | 10 | 11000 | APR | 12% | 0.3333333% | 12% | $36.66 |
| B | 22 | 1000 | APR | 12% | 0.7333333% | 12% | $7.33 |
| C | 35 | 5000 | APR | 6% | 0.5833333% | 6% | $29.16 |
| D | 40 | 6000 | APR | 4% | 0.44444% | 4% | $26.67 |
| E | 65 | 20000 | APR | 13% | 2.34772% | 13% | $469.44 |
| F | 40 | 10000 | Discount | 1% | 1% | 9% | $100.00 |
| F | 20 | 20000 | Discount | 1% | 1% | 18% | $200.00 |

After calculating the maximum discount percentage, the maximum APR, and the maximum earn, the split difference algorithm module 512 filters any ineligible invoices from the list of the one or more available invoices. Invoices may be determined to be ineligible based on the minimum APR acceptable, the minimum earn acceptable, and the minimum invoice amount. In this example, none of the invoices are determined to be ineligible.

Next, the split difference algorithm module 512 priority sorts the one or more available invoices based on one or more of a maximum APR, days paid early (DPE), and invoice amount. In other words, the split difference algorithm module 512 uses at least one of maximum APR, DPE, and invoice amount to sort the one or more invoices. In a first approach, the split difference algorithm module 512 may optimize around a longer DPE. In another approach, the split difference algorithm module 512 may optimize around a larger discount amount. In another approach, the split difference algorithm module 512 may optimize around higher APRs. In another example, the split difference algorithm module 512 may optimize around a longer DPE, then a larger discount amount, and then around higher APRs. The split difference algorithm module 512 can use one, two, or more factors for optimization. The split difference algorithm module 512 may take other factors into account when sorting the one or more available invoices. In the table below, the invoices are sorted by Max APR.

| Supplier | Days Paid Early (DPE) | Invoice Amount | Supplier Offer Type | Supplier Offer | Max Discount | Max APR | Max Earn |
|---|---|---|---|---|---|---|---|
| F | 20 | 20000 | Discount | 1% | 1% | 18% | $200.00 |
| E | 65 | 20000 | APR | 13% | 2.34722% | 13% | $469.44 |
| B | 22 | 1000 | APR | 12% | 0.7333333% | 12% | $7.33 |
| B | 10 | 11000 | APR | 12% | 0.3333333% | 12% | $36.66 |
| F | 40 | 10000 | Discount | 1% | 1% | 9% | $100.00 |
| A | 4 | 12000 | APR | 9% | 0.1% | 9% | $12.00 |
| A | 3 | 10000 | APR | 9% | 0.075% | 9% | $7.50 |
| C | 35 | 5000 | APR | 6% | 0.5833333% | 6% | $29.16 |
| D | 40 | 6000 | APR | 4% | 0.44444% | 4% | $26.67 |

The split difference algorithm module 512 determines a total weighted average APR for the total amount of invoices based on the sorted list of the one or more available invoices. In this case, the weighted average APR is the total weighted APR amount (all weighted APR amounts added together) divided by the total invoice amounts (all invoice amounts added together), 11060/95000=11.642%.

| Supplier | Days Paid Early (DPE) | Invoice Amount | Offer Type | Supplier Offer | Max Discount | Max APR | Max Earn | Inv. Weighted APR = APR * INV AMT |
|---|---|---|---|---|---|---|---|---|
| F | 20 | 20000 | Discount | 1% | 1% | 18% | $200.00 | 3600 |
| E | 65 | 20000 | APR | 13% | 2.34722% | 13% | $469.44 | 2600 |
| B | 22 | 1000 | APR | 12% | 0.7333333% | 12% | $7.33 | 120 |
| B | 10 | 11000 | APR | 12% | 0.3333333% | 12% | $36.66 | 1320 |
| F | 40 | 10000 | Discount | 1% | 1% | 9% | $100.00 | 900 |
| A | 4 | 12000 | APR | 9% | 0.1% | 9% | $12.00 | 1080 |
| A | 3 | 10000 | APR | 9% | 0.075% | 9% | $7.50 | 900 |
| C | 35 | 5000 | APR | 6% | 0.5833333% | 6% | $29.16 | 300 |
| D | 40 | 6000 | APR | 4% | 0.44444% | 4% | $26.67 | 240 |
| TOTAL |  | 95000 |  |  |  |  |  | 11060 |

11.642% is less than the desired return rate of 12%. As a result, the split difference algorithm module 512 iteratively removes one or more of the lowest ranked invoices and recalculates the weighted average APR until the weighted average APR is at or above the desired return rate. In this case, the invoice to supplier D for $6,000 is removed.

| F | 20 | 20000 | Discount | 1% | 1% | 18% | $200.00 | 3600 |
|---|---|---|---|---|---|---|---|---|
| E | 65 | 20000 | APR | 13% | 2.34722% | 13% | $469.44 | 2600 |
| B | 22 | 1000 | APR | 12% | 0.7333333% | 12% | $7.33 | 120 |
| B | 10 | 11000 | APR | 12% | 0.3333333% | 12% | $36.66 | 1320 |
| F | 40 | 10000 | Discount | 1% | 1% | 9% | $100.00 | 900 |
| A | 4 | 12000 | APR | 9% | 0.1% | 9% | $12.00 | 1080 |
| A | 3 | 10000 | APR | 9% | 0.075% | 9% | $7.50 | 900 |
| C | 35 | 5000 | APR | 6% | 0.5833333% | 6% | $29.16 | 300 |
| D | 40 | 6000 | APR | 4% | 0.44444% | 4% | $26.67 | 240 |
| TOTAL |  | 89000 |  |  |  |  |  | 10820 |

After removing the lowest ranked invoice to supplier D, the new weighted average APR=10820/89000=12.1573%. This exceeds the desired return amount of 12%. The new weighted average APR exceeds the desired return rate. The split difference algorithm module 512 determines a split difference ratio is equal to (1−exact algorithm ratio)*(split difference percentage+exact algorithm ratio).

In this example, the split difference algorithm module 512 determines a split difference algorithm ratio based on the weighted average APR, the desired return amount, and the split difference percentage. The exact algorithm ratio is determined to be 12/12.1573=0.987061. Next, the split difference algorithm module 512 determines the split difference algorithm ratio=(1−exact algorithm ratio)*(split difference percentage)+(exact algorithm ratio). Here, the split difference algorithm ratio is equal to (1−0.987061)*(0.5)+0.987061=0.993531. The split difference algorithm module 512 applies the determined split difference algorithm ratio to the invoice information of each of the one or more invoices in the list of invoices, including the discount, APR, earn, and invoice amount. This becomes the revised offer.

| Supplier | Split Difference Ratio | Revised Offer Discount | Initial Offer APR | Initial Offer Earn | New Invoice Amount |
|---|---|---|---|---|---|
| F | 0.993531 | 0.99% | 17.88% | $198.71 | $19,801.29 |
| E | 0.993531 | 2.33% | 12.92% | $466.40 | $19,533.60 |
| B | 0.993531. | 0.73% | 11.92% | $7.28 | $992.72 |
| B | 0.993531. | 0.33% | 11.92% | $36.42 | $10,963.58 |

-continued

| Supplier | Split Difference Ratio | Revised Offer Discount | Initial Offer APR | Initial Offer Earn | New Invoice Amount |
|---|---|---|---|---|---|
| F | 0.993531 | 0.99% | 8.94% | $99.35 | $9,900.65 |
| A | 0.993531 | 0.10% | 8.94% | $11.92 | $11,988.08 |
| A | 0.993531 | 0.07% | 8.94% | $7.45 | $9,992.55 |
| C | 0.993531 | 0.58% | 5.96% | $28.97 | $4,971.03 |

After the revised offers are determined, the split difference algorithm module 512 sorts the list of the one or more invoices by one or more of offered revised offer APR that is based on the maximum APR and the split difference ratio, a revised offer discount and then a new invoice amount. The split difference algorithm module 512 may take other factors into account when sorting the one or more invoices. After sorting the invoices, some of the one or more invoices are selected based on the new invoice amount by iterating through the one or more invoices. If the running cash total equal to the sum of one or more new invoice amounts is less than the cash pool amount and the calculated weighted average APR is greater than the desired APR, then an invoice is selected. If the running cash total amount is greater than the cash pool amount, the invoice is skipped. If the running cash total is less than the cash pool and the calculated weighted average APR is less than the desired APR, the APR is raised up to the maximum for the offer. At this point, the split difference algorithm module 512 redetermines whether the offer is eligible for acceptance. Otherwise, the invoice is skipped. The split difference algorithm module 512 determines the buyer finalized return rate, one or more supplier finalized winning offers, a new invoice total amount for the one or more selected invoices, and an invoice discount amount for the one or more selected invoices. In this case, the split difference algorithm module 512 provides the buyer with an awarded amount of nearly $62,000 (sum of new invoice amount) and a split difference return greater than 12% APR by selecting the invoices shown below.

| Supplier | Split Difference Ratio | Revised Offer Discount | Revised Offer APR | Revised Offer Earn | New Invoice Amount |
|---|---|---|---|---|---|
| F | 0.993531 | 0.99% | 17.88% | $198.71 | $19,801.29 |
| E | 0.993531 | 2.33% | 12.92% | $466.40 | $19,533.60 |
| B | 0.993531 | 0.73% | 11.92% | $7.28 | $992.72 |
| B | 0.993531 | 0.33% | 11.92% | $36.42 | $10,963.58 |
| F | 0.993531 | 0.99% | 8.94% | $99.35 | $9,900.65 |

The order application 402 includes the under hurdle max algorithm module 514 that determines how to distribute a cash pool allocated by a buyer to the one or more suppliers for the buyer that chooses to participate in an auction provided by the dynamic marketplace. Each discrete buyer of a plurality of buyers having a unique cash flow situation receives a disparate, utility based return rate for early payment of accounts payable or another debt obligation and each discrete supplier of a plurality of suppliers having a unique cash flow situation receives a disparate, utility based early payment of accounts receivable or another credit based on a disparate, utility based return rate given to a buyer.

According to one aspect, the order application 402 executes the under hurdle max algorithm module 514. The under hurdle max algorithm module 514 receives a desired return amount and a cash pool amount from the buyer client computing device 102, e.g., 9% APR and $100,000. In one example, the under hurdle max algorithm module 514 optionally utilizes minimum APR acceptable, e.g., 2%, a minimum earn acceptable, e.g., $0.01, and a minimum invoice amount, e.g., $1.00. Before executing the under hurdle max algorithm, the under hurdle max algorithm module 514 receives data associated with one or more invoices and offers for the one or more invoices. The under hurdle max algorithm module 514 evaluates data for a list of one or more available invoices provided by a buyer and associated with the cash pool. The under hurdle max algorithm module 514 also evaluates one or more offers from one or more suppliers, each having a particular APR or a discount percentage that the supplier is willing to accept in exchange for early payment. An example list of the one or more available invoices and offers is shown below.

| Supplier | Days Paid Early (DPE) | Invoice Amount | Supplier Offer Type | Supplier Offer |
|---|---|---|---|---|
| A | 3 | 10000 | APR | 7% |
| A | 4 | 12000 | APR | 7% |
| B | 10 | 11000 | APR | 10% |
| B | 22 | 1000 | APR | 10% |
| C | 35 | 5000 | APR | 6% |
| D | 40 | 6000 | APR | 3% |
| E | 65 | 20000 | APR | 13% |
| F | 40 | 10000 | Discount | 1% |
| F | 20 | 2000 | Discount | 1% |
| G | 20 | 8000 | APR | 2% |
| H | 20 | 10000 | APR | 5% |
| I | 20 | 15000 | APR | 8% |

The under hurdle max algorithm module 514 receives an under hurdle percentage, a minimum offer percentage, and a percentile cutoff from an administrator. As an example, the under hurdle percentage may be 0.4, the minimum offer percentage may be 0.7, and the percentile cutoff may be 0.9. Next, the under hurdle max algorithm module 514 calculates a maximum discount, a maximum APR, and a max earn for each of the one or more available invoices.

| Supplier | Days Paid Early (DPE) | Invoice | Supplier Offer Type | Supplier Offer | Max Discount | Max APR | Max Earn |
|---|---|---|---|---|---|---|---|
| A | 3 | 10000 | APR | 7% | 0.000583333 | 7% | $5.83 |
| A | 4 | 12000 | APR | 7% | 0.000777778 | 7% | $9.33 |
| B | 10 | 11000 | APR | 10% | 0.002777778 | 10% | $30.56 |
| B | 22 | 1000 | APR | 10% | 0.006111111 | 10% | $6.11 |
| C | 35 | 5000 | APR | 6% | 0.005833333 | 6% | $29.17 |
| D | 40 | 6000 | APR | 3% | 0.003333333 | 3% | $20.00 |
| E | 65 | 20000 | APR | 13% | 0.023472222 | 13% | $469.44 |
| F | 40 | 10000 | Discount | 1% | 0.01 | 9% | $100.00 |
| F | 20 | 20000 | Discount | 1% | 0.01 | 18% | $200.00 |
| G | 20 | 8000 | APR | 2% | 0.001111111 | 2% | $8.89 |
| H | 20 | 10000 | APR | 5% | 0.002777778 | 5% | $27.78 |
| I | 20 | 15000 | APR | 8% | 0.004444444 | 8% | $66.67 |

After calculating the maximum discount percentage, the maximum APR, and the maximum earn, the under hurdle max algorithm module 514 filters any ineligible invoices from the list of the one or more available invoices. Invoices may be determined to be ineligible based on the minimum APR acceptable, the minimum earn acceptable, and the minimum invoice amount. In this example, none of the invoices are determined to be ineligible.

Next, the under hurdle max algorithm module 514 priority sorts the one or more available invoices based on one or more of maximum APR, days paid early (DPE), and invoice amount. In other words, the under hurdle max algorithm 514 uses at least one of maximum APR, DPE, and invoice amount to sort the one or more available invoices. In a first approach, the under hurdle max algorithm module 514 may optimize around a longer DPE. In another approach, the under hurdle max algorithm module 514 may optimize around a larger discount amount. In another approach, the under hurdle max algorithm module 514 may optimize around higher APRs. In another example, the under hurdle max algorithm module 514 may optimize around a longer DPE, then a larger discount amount, and then around higher APRs. The under hurdle max algorithm module 514 can use one, two, or more factors for optimization. The under hurdle max algorithm module 514 may take other factors into account when sorting the one or more available invoices. In the table below, the invoices are sorted by Max APR.

| Supplier | Days Paid Early (DPE) | Invoice Amount | Supplier Offer Type | Supplier Offer | Max Discount | Max APR | Max Earn |
|---|---|---|---|---|---|---|---|
| F | 20 | 20000 | Discount | 1% | 0.01 | 18% | $200.00 |
| E | 65 | 20000 | APR | 13% | 0.023472222 | 13% | $469.44 |
| B | 10 | 11000 | APR | 10% | 0.002777778 | 10% | $30.56 |
| B | 22 | 1000 | APR | 10% | 0.006111111 | 10% | $6.11 |
| F | 40 | 10000 | Discount | 1% | 0.01 | 9% | $100.00 |
| I | 20 | 15000 | APR | 8% | 0.004444444 | 8% | $66.67 |
| A | 3 | 10000 | APR | 7% | 0.000583333 | 7% | $5.83 |
| A | 4 | 12000 | APR | 7% | 0.000777778 | 7% | $9.33 |
| C | 35 | 5000 | APR | 6% | 0.005833333 | 6% | $29.17 |
| H | 20 | 10000 | APR | 5% | 0.002777778 | 5% | $27.78 |
| D | 40 | 6000 | APR | 3% | 0.003333333 | 3% | $20.00 |
| G | 20 | 8000 | APR | 2% | 0.001111111 | 2% | $8.89 |

The under hurdle max algorithm module 514 determines a total weighted average APR for the total amount of invoices based on the sorted list of the one or more available invoices. In this case, the weighted average APR for the invoices is the total weighted APR amount (all weighted APR amounts added together) divided by the total invoice amounts (all invoice amounts added together)=12180/128000=9.5156%.

| Supplier | Days Paid Early (DPE) | Invoice | Supplier Offer Type | Supplier Officer | Max Discount | Max APR | Max Earn | Invoice Weighted APR = APR * INV AMT |
|---|---|---|---|---|---|---|---|---|
| F | 20 | 20000 | Discount | 1% | 0.01 | 18% | $200.00 | 3600 |
| E | 65 | 20000 | APR | 13% | 0.023472222 | 13% | $469.44 | 2600 |
| B | 10 | 11000 | APR | 10% | 0.002777778 | 10% | $30.56 | 1100 |
| B | 22 | 1000 | APR | 10% | 0.006111111 | 10% | $6.11 | 100 |
| F | 40 | 10000 | Discount | 1% | 0.01 | 9% | $100.00 | 900 |
| I | 20 | 15000 | APR | 8% | 0.004444444 | 8% | $66.67 | 1200 |
| A | 3 | 10000 | APR | 7% | 0.000583333 | 7% | $5.83 | 700 |
| A | 4 | 12000 | APR | 7% | 0.000777778 | 7% | $9.33 | 840 |
| C | 35 | 5000 | APR | 6% | 0.005833333 | 6% | $29.17 | 300 |
| H | 20 | 10000 | APR | 5% | 0.002777778 | 5% | $27.78 | 500 |
| D | 40 | 6000 | APR | 3% | 0.003333333 | 3% | $20.00 | 180 |
| G | 20 | 8000 | APR | 2% | 0.001111111 | 2% | $8.89 | 160 |
| Total | | 128000 | | | | | | 12180 |

9.5156% is greater than or equal to the desired return amount of 9%. As a result, the under hurdle max algorithm module 514 does not remove any of the invoices. If the weighted average APR was less than the desired return amount, then the under hurdle max algorithm module 514 iteratively removes one or more of the lowest ranked invoices and recalculates the weighted average APR until the weighted average APR is equal to or greater than the desired return amount.

The under hurdle max algorithm module 514 determines an under hurdle max ratio based on the weighted average APR, the desired return amount, and the minimum offer percentage. The under hurdle max algorithm module 514 determines the under hurdle max ratio as the desired return amount divided by the weighted average APR=9/9.5156=0.94581. Next, the under hurdle max algorithm module 514 compares this under hurdle max ratio with the minimum offer percentage and selects the greater value. Here, 0.94581 is greater than 0.7.

The under hurdle max algorithm module 514 determines a revised offer for each of the one or more invoices. If the invoice max APR is less than the under hurdle percentage, then the under hurdle max ratio for this invoice is set to 1.0. If the invoice was determined to be ineligible or has been removed, then the under hurdle max ratio for this invoice is set to 1.0. Otherwise, the under hurdle max ratio for this invoice is set to (i) the under hurdle max ratio if the under hurdle max ratio is greater than the minimum offer percentage or (ii) the minimum offer percentage if the minimum offer percentage is greater than the under hurdle max ratio.

| Supplier | Under Hurdle Max Ratio | Revised Offer Discount | Revised Offer APR | Revised Offer Earn | New Invoice Amount |
|---|---|---|---|---|---|
| F | 0.9458 | 0.009458 | 17.02% | $189.16 | $19,810.84 |
| E | 0.9458 | 0.022200028 | 12.30% | $444.00 | $19,556.00 |
| B | 0.9458 | 0.002627222 | 9.46% | $28.90 | $10,971.10 |
| B | 0.9458 | 0.005779889 | 9.46% | $5.78 | $994.22 |
| F | 0.9458 | 0.009458 | 8.51% | $94.58 | $9,905.42 |
| I | 1 | 0.004444444 | 8.00% | $66.67 | $14,933.33 |
| A | 1 | 0.000583333 | 7.00% | $5.83 | $9,994.17 |
| A | 1 | 0.000777778 | 7.00% | $9.33 | $11,990.67 |
| C | 1 | 0.005833333 | 6.00% | $29.17 | $4,970.83 |
| H | 1 | 0.002777778 | 5.00% | $27.78 | $9,972.22 |
| D | 1 | 0.003333333 | 3.00% | $20.00 | $5,980.00 |
| G | 1 | 0.001111111 | 2.00% | $8.89 | $7,991.11 |

After the one or more revised offers are determined, the under hurdle max algorithm module 514 determines a probability score (P-score) for each of the invoices. The under hurdle max algorithm uses the P-score to exclude inferior or lesser offers from consideration. For each of the invoices, the under hurdle max algorithm module 514 determines the P-score.

First, the under hurdle max algorithm module 514 determines a Z-score for each of the invoices. The Z-score is used to compare a particular invoice with other invoices in the list and for selected values associated with the invoice, determine a value for standard deviations above or below the mean for the selected values. As an example, a Z-score may be determined for one or more values associated with each invoice including revised offer earn and revised offer APR. However, the Z-score may be determined for other values. The Z-score is equal to the value to be compared minus the mean of the value to be compared for all invoices divided by the standard deviation for the value for all of the invoices.

$$z = \frac{x - \bar{x}}{s}$$

After the Z-score is determined, the under hurdle max algorithm module 514 converts the Z-score to the P-score by looking up the Z-score in the standard normal table. The standard normal table, or Z-table, is used to determine whether the value associated with the invoice is below, above, or between values on the standard normal distribution. As an example, the Z-score for revised offer earn and the Z-score for the revised offer APR may be converted to the P-score for the revised offer earn and the P-score for the revised offer APR. After determining the P-score for each of the values to be compared, the under hurdle max algorithm module 514 sums a total P-score for each of the values to be compared. The under hurdle max algorithm module 514 compares the total P-score for each of the invoices with the under hurdle percentage.

If the P-score is less than the under hurdle percentage, then the invoice is removed or excluded from consideration because this invoice is deemed to be an inferior or lesser offer as compared with other available offers. In this case, the bottom two invoices are removed because they have a P-score less than 0.4, the under hurdle percentage.

The bottom two invoices from D and G represent one or more first offers from one or more first creditor-suppliers that provide a lowest degree of return as compared with other offers of the plurality of offers based on the P-score.

| Supplier | Under Hurdle Max Ratio | Revised Offer Discount | Revised Offer APR | Revised Offer Earn | New Invoice Amount | Probability Score |
|---|---|---|---|---|---|---|
| F | 0.9458 | 0.009458 | 17.02% | $189.16 | $19,810.84 | >1.5 |
| E | 0.9458 | 0.022200028 | 12.30% | $444.00 | $19,556.00 | >1.5 |
| B | 0.9458 | 0.002627222 | 9.46% | $28.90 | $10,971.10 | >1.5 |
| B | 0.9458 | 0.005779889 | 9.46% | $28.90 | $10,971.10 | >1.5 |
| F | 0.9458 | 0.009458 | 8.51% | $94.58 | $9,905.42 | >1.5 |
| I | 1 | 0.004444444 | 8.00% | $66.67 | $14,933.33 | 1.85 |
| A | 1 | 0.000583333 | 7.00% | $5.83 | $9,994.17 | 1.42 |
| A | 1 | 0.000777778 | 7.00% | $9.33 | $11,99.67 | 1.59 |
| C | 1 | 0.005833333 | 6.00% | $29.17 | $4,970.83 | 0.84 |
| H | 1 | 0.002777778 | 5.00% | $27.78 | $9,972.22 | 0.9 |
| D | 1 | 0.003333333 | 3.00% | $20.00 | $5,980.00 | 0.26 |
| G | 1 | 0.001111111 | 2.00% | $8.89 | $7,991.11 | 0.18 |

After removing the bottom two invoices, the under hurdle max algorithm module 514 recalculates the weighted average APR and the under hurdle max ratio. The under hurdle max algorithm module 514 determines the weighted average APR based on the sorted list of the one or more available invoices that are still present in the list. The weighted average APR is the current weighted average APR divided by the current total invoice amount, which is 11840/114000=10.385%. The under hurdle max ratio is equal to desired return rate divided by the weighted average APR=9%/10.385%=0.866. The percentile cutoff was 0.9. 0.866 is under 0.9, so the winning offers may now be selected.

If the under hurdle max ratio was above the percentile cutoff, then the under hurdle max algorithm would continue to recalculate the weighted average APR and the under hurdle max ratio until the under hurdle max ratio is less than the percentile cutoff. The under hurdle max algorithm module 514 iteratively would remove invoices based on the P-score and recalculate the weighted average APR and the under hurdle max ratio.

| Supplier | Under Hurdle Max Radio | Revised Offer Discount | Revised Offer APR | Revised Offer Earn | New Invoice |
|---|---|---|---|---|---|
| F | 0.86655 | 0.0086655 | 15.60% | $173.31 | $19,826.69 |
| E | 0.86655 | 0.020339854 | 11.27% | $406.80 | $19,593.20 |
| B | 0.86655 | 0.002407083 | 8.67% | $26.48 | $10,973.52 |
| B | 0.86655 | 0.005295583 | 8.67% | $5.30 | $994.70 |
| F | 0.86655 | 0.0086655 | 7.80% | $86.66 | $9,913.35 |
| I | 1 | 0.004444444 | 8.00% | $66.67 | $14,933.33 |
| A | 1 | 0.000583333 | 7.00% | $5.83 | $9,994.17 |
| A | 1 | 0.000777778 | 7.00% | $9.33 | $11,990.67 |
| C | 1 | 0.005833333 | 6.00% | $29.17 | $4,970.83 |
| H | 1 | 0.002777778 | 5.00% | $27.78 | $9,972.22 |

After the revised offer discount, revised offer APR, revised offer earn, and new invoice amount are determined, the under hurdle max algorithm module 514 determines another P-score for each of the invoices. If the P-score is less than the under hurdle percentage, then the invoice is removed. In this case, none of the remaining invoices are removed.

After the revised offer discount, revised offer APR, revised offer earn, and new invoice amount are determined, the under hurdle max algorithm module 514 sorts the list of the one or more invoices by one or more of the revised APR that is based on the maximum APR and the under hurdle max ratio, the revised offer discount, and the new invoice amount. The under hurdle max algorithm module 514 may take other factors into account when sorting the one or more invoices. After sorting the invoices, some of the one or more invoices are selected based on the new invoice amount by iterating through the one or more invoices.

The under hurdle max algorithm module 514 selects one or more second offers from one or more second creditor-suppliers that provide a highest degree of return as compared with the other offers of the plurality of offers based on the P-score. These second offers are represented by the invoices

| Supplier | DPE | Invoice Amount | Offer Type | Offer Rate | Max Discount | Max APR | Max Earn | Invoice Weighted APR = APR * Inv. Amt. |
|---|---|---|---|---|---|---|---|---|
| F | 20 | 20000 | Discount | 1% | 0.01 | 18% | $200.00 | 3600 |
| E | 65 | 20000 | APR | 13% | 0.023472222 | 13% | $469.44 | 2600 |
| B | 10 | 11000 | APR | 10% | 0.002777778 | 10% | $30.56 | 1100 |
| B | 22 | 1000 | APR | 10% | 0.006111111 | 10% | $6.11 | 100 |
| F | 40 | 10000 | Discount | 1% | 0.01 | 9% | $100.00 | 900 |
| I | 20 | 15000 | APR | 8% | 0.004444444 | 8% | $66.67 | 1200 |
| A | 3 | 10000 | APR | 7% | 0.000583333 | 7% | $5.83 | 700 |
| A | 4 | 12000 | APR | 7% | 0.000777778 | 7% | $9.33 | 840 |
| C | 35 | 5000 | APR | 6% | 0.005833333 | 6% | $29.17 | 300 |
| H | 20 | 10000 | APR | 5% | 0.002777778 | 5% | $27.78 | 500 |
| Total | | 114000 | | | | | | 11840 |

The under hurdle max algorithm module 514 applies the determined under hurdle max ratio or 1.0 to each of the remaining invoices. When the under hurdle max ratio is applied to the offered discount and the offered APR, these values are reduced by a factor based on the under hurdle max ratio to determine the revised offered discount, the revised offer APR, the revised offer earn, and the new invoice amount.

that have the under hurdle max ratio of 0.86655. In addition, the under hurdle max algorithm module 514 selects one or more third offers from one or more third creditor-suppliers that provide a degree of return between the lowest degree of return and the highest degree of return as compared with the other offers of the plurality of offers based on the P-score. These third offers are represented by the invoices that have the under hurdle max ratio of 1. The under hurdle max algorithm module 514 returns at least the desired return rate to the buyer-debtor and splits at least some extra return over the desired return rate between the buyer-debtor and the one or more second creditor-suppliers based on the under hurdle max ratio.

If the running cash total equal to the sum of one or more new invoice amounts is less than the cash pool amount and the calculated weighted average APR is greater than the desired APR, then an invoice is selected. If the running cash total is greater than the cash pool amount, the invoice is skipped. If the running cash total is less than the cash pool amount and the calculated weighted average APR is less than the desired APR, the APR is raised up to the maximum for the offer. At this point, the under hurdle max algorithm module 514 redetermines whether the offer is eligible for acceptance. Otherwise, the invoice is skipped. The under hurdle max algorithm module 514 determines the buyer finalized return rate, one or more supplier finalized winning offers, a new invoice total amount for the one or more selected invoices, and an invoice discount amount for the one or more selected invoices. In this case, the under hurdle max algorithm module 514 provides the buyer with an awarded amount of nearly $100,000 (sum of new invoice amount) and an under hurdle max return.

| Supplier | Under Hurdle Max Ratio | Revised Offer Discount | Revised Offer APR | Revised Offer Earn | New Invoice Amount |
|---|---|---|---|---|---|
| F | 0.86655 | 0.0086655 | 15.60% | $173.31 | $19,826.69 |
| E | 0.86655 | 0.020339854 | 11.27% | $406.80 | $19,593.20 |
| B | 0.86655 | 0.002407083 | 8.67% | $26.48 | $10,973.52 |
| B | 0.86655 | 0.005295583 | 8.67% | $5.30 | $994.70 |
| F | 0.86655 | 0.0086655 | 7.80% | $86.66 | $9,913.35 |
| I | 1 | 0.004444444 | 8.00% | $66.67 | $14,933.33 |
| A | 1 | 0.000583333 | 7.00% | $5.83 | $9,994.17 |
| A | 1 | 0.000777778 | 7.00% | $9.33 | $11,990.67 |

The order application 402 includes an award module 516 that communicates the auction results to the buyer client computing device 102 and optionally communications information about a supplier's winning offer to the supplier client computing device 104. The results may be sent as an award CSV file that may be formatted as an eSLAP file as an award file in a different format, or using another method. The award file or other communication may include one or more of auction results, information about one or more invoices, and information about one or more winning offers. The results may be sent in response to a web request, via email, via push notification, via a web API call, and others. In one aspect, Upon completion of the auction, the award module 516 optionally may release payment information as the CSV file or the eSLAP file and/or send a message to one or more banking computing devices to release payment to the one or more supplier client computing devices 104. In addition, the payment module 516 may charge the buyer user and/or the supplier user the fee associated with the invoice and/or offer. The payment module 516 may store information associated with the payment in the database 108 and/or the memory 122.

The order application 402 includes a statistics module 518 to receive and store information associated with each buyer, each supplier, each invoice opportunity, each cash pool, each auction, and each offer received by the order application 402. The information associated with each invoice opportunity may include a start date/time of the invoice opportunity, a need-by date/time for the invoice opportunity, an ending time of the invoice opportunity, an acceptance time of the invoice opportunity (e.g., a market closing time), an associated buyer user, one or more associated supplier users, a buyer requested return rate, one or more supplier requested offers, a buyer finalized return rate, one or more supplier finalized offers, an invoice total amount, an invoice discount amount, and other offer information, among other information. This information may be stored in the database 108 and/or in the memory 122, among other locations.

The statistics module 518 may generate statistics or analytics about current or past auctions, buyers, suppliers, cash pools, and invoice opportunities. As an example, the statistics module 518 may generate analytics for the buyer users and the supplier users. As another example, the statistics module 518 may generate a list or visual representation of current invoice opportunities for a particular buyer user or a particular supplier user or past invoice opportunities for a particular buyer user or a particular supplier user over a particular period of time. As another example, the statistics module 518 may generate a list or visual representation of current invoice opportunities available in the marketplace or past invoice opportunities over a particular period of time in the marketplace. As an additional example, the statistics module 518 may generate average values and/or a visual representation of current invoice opportunities available in the marketplace or past invoice opportunities over a particular period of time in the marketplace. The visual representation may be a graph that is one of a pie graph, a bar graph, and a line graph, among other types of graphs and representations.

According to a further embodiment, the order application 402 may select the invoices based on the statistics information available to the statistics module 518. As an example, in addition to the algorithm, winning invoices may be selected based on, at least in part, supplier and/or buyer past participation, supplier offer history, cost of debt for the supplier and/or the buyer, and other information.

The order application 402 includes a user interface module 520. The user interface module 520 receives requests or other communications from the one or more buyer client computing devices 102 and the one or more supplier client computing devices 104 and transmits a representation of requested information, user interface elements, and other data and communications to the buyer client computing device 102 and the supplier client computing device 104 for display on the display 204 and the display 304. As an example, the user interface module 520 generates a native and/or web-based graphical user interface (GUI) that accepts input and provides output by generating content that is transmitted via the communication network 110 and viewed by a user of the buyer client computing device 102 and/or a user of the supplier client computing device 104. The user interface module 520 may provide realtime automatically and dynamically refreshed information to the user of the server computing device 106, the buyer client computing device 102 and the supplier client computing device 104 using Java, Javascript, AJAX (Asynchronous Javascript and XML), ASP.NET, Microsoft .NET, and/or node.js, among others. The user interface module 520 may send data to other modules of the order application 402 of the server computing device 106, and retrieve data from other modules of the order application 402 of the server computing device 106 asynchronously without interfering with the display and behavior of the web page displayed by the buyer client computing device 102 and the supplier client computing device 104. As an example, data may be retrieved using XMLHttpRequest objects or using WebSocket.

Figure 6:
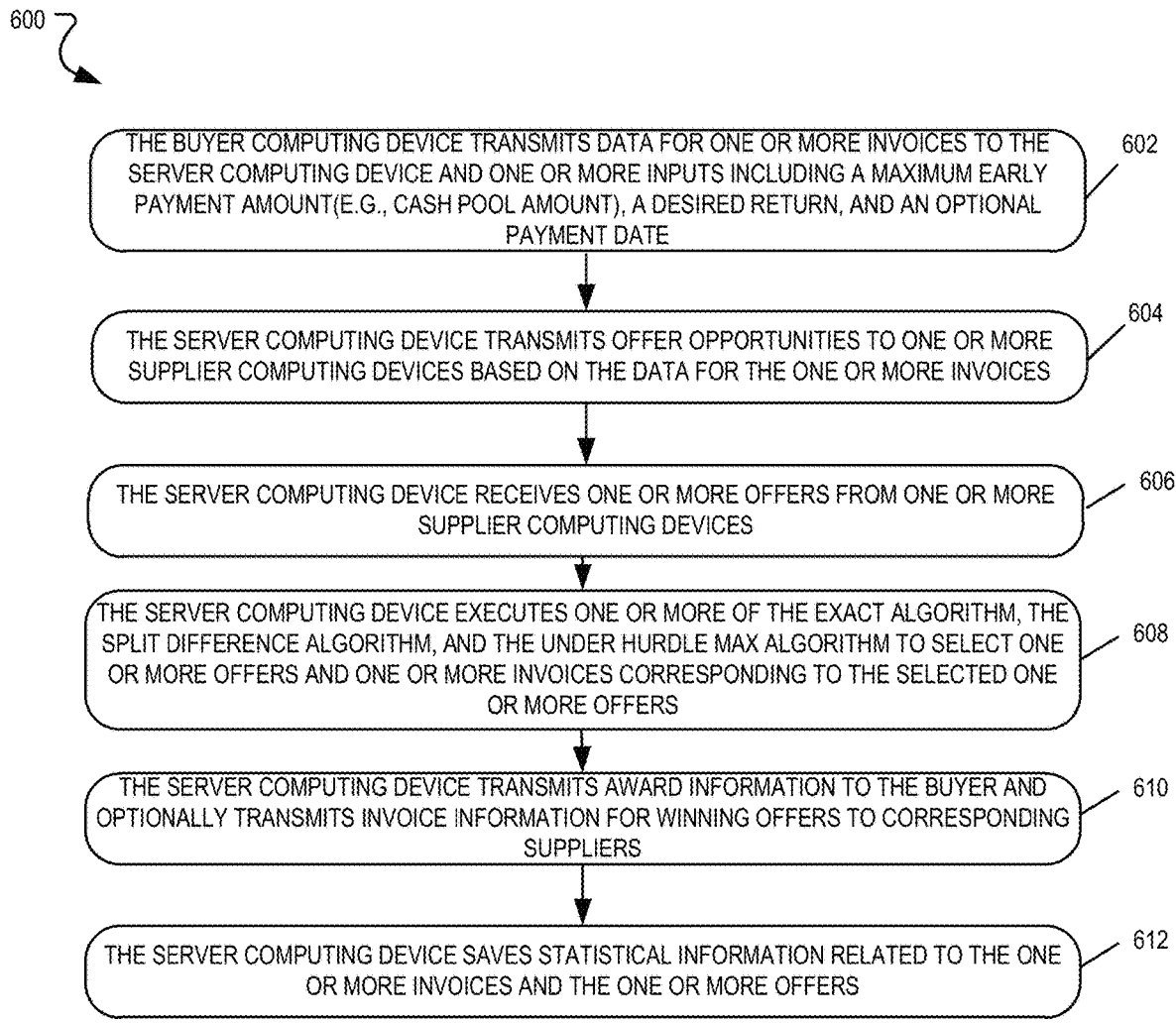
FIG. 6 illustrates a flowchart of a process for creating one or more invoice opportunities and selecting one or more invoices to fill a cash pool according to an example embodiment.

FIG. 6 illustrates a flowchart of a process 600 executed by the order application 402 of the server computing device 106 for creating one or more invoice opportunities and selecting one or more invoices to fill a cash pool according to an example embodiment. The process 600 shown in FIG. 6 begins at 602.

At 602, one or more buyer client computing devices 102 transmit data for one or more invoices (e.g., invoice information associated with one or more invoices), and one or more buyer inputs, including a maximum early payment amount, e.g., a cash pool amount, a desired minimum return, and an optional payment date to the server computing device 106. The data for the one or more invoices may be sent to the order application 402. The data for the one or more invoices may be included in a CSV file and/or an eSLAP file. In addition, the data for the one or more invoices may be sent via an API call.

At 604, the server computing device 106 transmits an plurality of offer opportunities based on the one or more invoices to one or more supplier client computing devices 104. The server computing device 106 determines the one or more supplier client computing devices 104 that correspond with the one or more invoices by querying the market database 108. In step 606, the server computing device 106 receives one or more offers from the one or more supplier client computing devices 104. Each offer corresponds to one or more of the supplier's invoices and may include an APR or a discount percentage that the supplier is willing to offer to the buyer in exchange for early payment.

At 608, the server computing device 106 executes one or more of the exact algorithm, the split difference algorithm, and the under hurdle max algorithm to select one or more offers from one or more suppliers. Each discrete buyer of a plurality of buyers having a unique cash flow situation receives a disparate, utility based return (e.g., APR, discount, or amount) for early payment of accounts payable. Each discrete supplier of a plurality of suppliers having a unique cash flow situation receives an early payment of accounts receivable in return for providing a disparate, utility based return (e.g., APR, discount, or amount) to a buyer on its accounts payable. The order application 402 executes one or more of the exact algorithm, the split difference algorithm, and the under hurdle max algorithm to determine how to optimally distribute early payment of a buyer's cash pool to one or more invoices of one or more suppliers to achieve the buyer's desired return while simultaneously achieving or beating the return rate offered by each supplier for the early payment of its invoices. The algorithms aim to encourage continued participation by the buyer and the one or more suppliers.

At 610, the order application 402 of the server computing device 106 transmits award information to the buyer client computing device 102. The award information has auction results. The server computing device 106 also optionally may transmit winning invoice information to one or more supplier client computing devices 104. For example, the server computing device 106 may transmit invoice information for invoices selected in the auction to fulfill a cash pool to each supplier such as the revised invoice amount, DPE, revised return rate, and other information. The server computing device 106 notifies the buyer client computing device 102 and optionally notifies the one or more supplier client computing devices 104 of the results of the auction. The results may be included in a CSV file, an eSLAP file, and/or in another format The results may be included in a CSV file and/or an eSLAP file. In addition, the results may be sent via an API call, or otherwise.

At 612, the server computing device 106 stores statistical information related to the auction results in the memory 122 and/or the database 108. The statistical information may include information associated with each buyer, each supplier, each invoice opportunity, each auction, and each offer received by the order application 402. The information may include a start date/time of the invoice opportunity, a need-by date/time for the invoice opportunity, an ending time of the invoice opportunity, an acceptance time of the invoice opportunity, an original due date for the invoice opportunity, one or more buyer maximum early payment amounts, one or more supplier requested early payment amounts, one or more associated buyer users, one or more associated supplier users, one or more buyer requested minimum return rates, one or more supplier requested offers, one or more buyer finalized return rates, one or more supplier finalized offers, an invoice total amount, an invoice discount amount, and offer information, among other information. This information may be stored in the database 108 and/or in the memory 122, among other locations.

Figure 7:
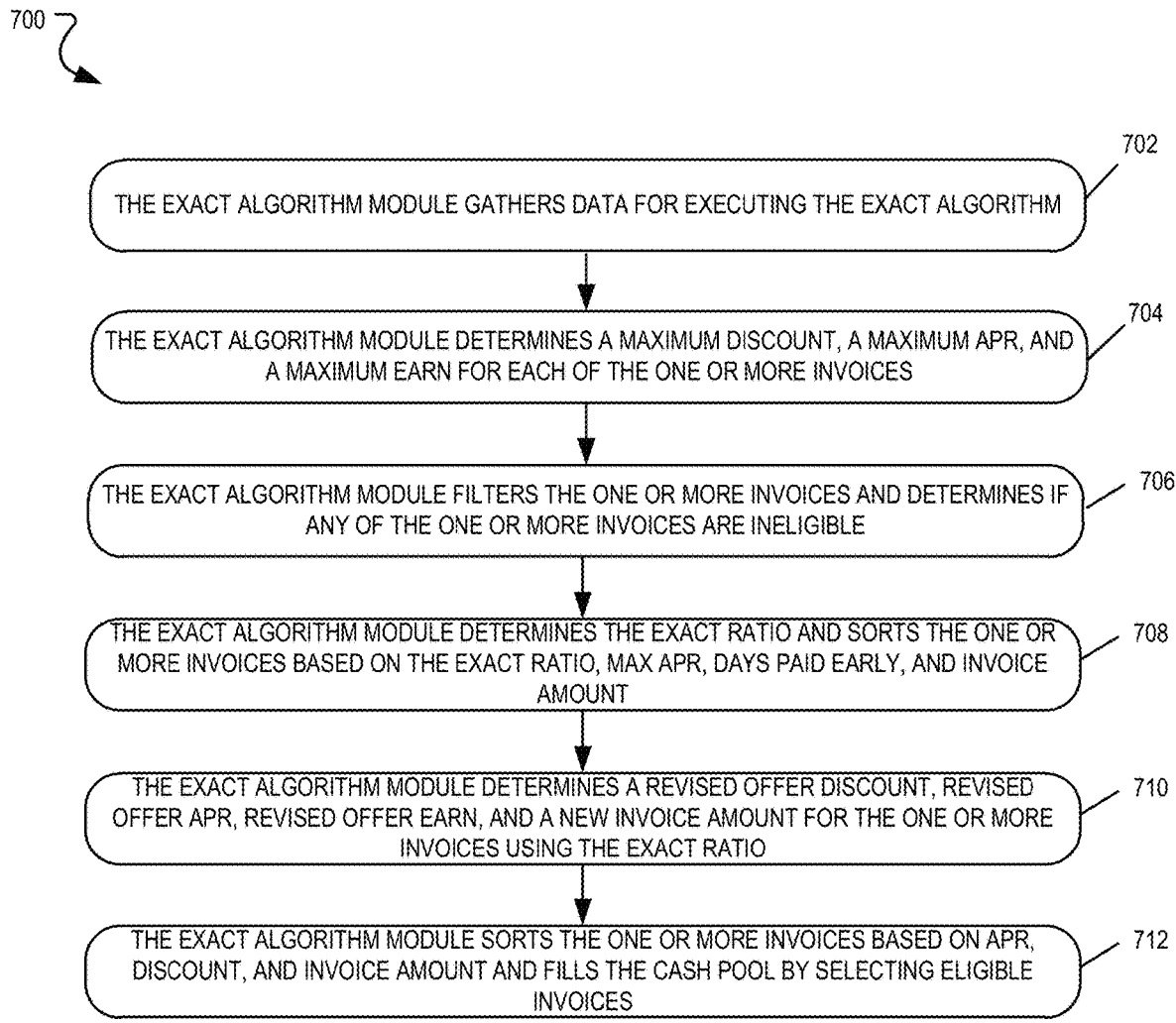
FIG. 7 illustrates a flowchart of a process for filling a cash pool using an exact algorithm according to an example embodiment.

FIG. 7 illustrates a flowchart of a process 700 for filling a cash pool amount using the exact algorithm according to an example embodiment. The process 700 shown in FIG. 7 begins at 702.

The server computing device 106 executes the exact algorithm. At 702, the exact algorithm module 510 gathers data for executing the exact algorithm including buyer settings (cash pool amount, desired return, minimum APR acceptable, minimum earn acceptable, minimum invoice amount, and optional payment date) and inputs, data for the one or more invoices provided by the buyer user, and one or more offers on the one or more invoices submitted by the supplier users.

At 704, the exact algorithm module 510 determines a maximum discount, a maximum APR, and a maximum earn for each of the one or more invoices. At 706, the exact algorithm module 510 filters the one or more invoices and determines if any of the one or more invoices are ineligible using the buyer settings (cash pool amount, desired return, minimum APR acceptable, minimum earn acceptable, minimum invoice amount, and optional payment date) and removes any ineligible invoices from consideration by the exact algorithm.

At 708, the exact algorithm module 510 determines the exact ratio and sorts the one or more invoices based on one or more of maximum APR, days paid early, and invoice amount. The exact algorithm module 510 determines the weighted APR for each invoice, the weighted average APR for all of the one or more invoices and the total invoice amount and removes any invoices from consideration if the weighted average APR is less than the desired return. When the weighted average APR is greater than or equal to the desired return, the exact algorithm module 510 determines the exact ratio based on the desired return and the weighted average APR.

At 710, the exact algorithm module 510 determines a revised offer discount, a revised offer APR, a revised offer earn, and a new invoice amount for each of the remaining one or more invoices using the exact ratio. At 712, the exact algorithm module 510 fills the cash pool amount of the buyer by selecting eligible invoices. If the running cash total is less than the cash pool amount and the calculated weighted APR is greater than the desired APR, then an invoice is selected. If the running cash total is greater than the cash pool amount, the invoice is skipped. If the running cash total is less than the cash pool amount and the calculated weighted APR is less than the desired APR, the APR is raised up to the maximum for the offer. At this point, the exact algorithm module 510 redetermines whether the offer is eligible for acceptance. Otherwise, the invoice is skipped. The exact algorithm module 510 provides the buyer with an awarded amount and a return of the desired APR by selecting the invoices using the exact algorithm.

Figure 8:
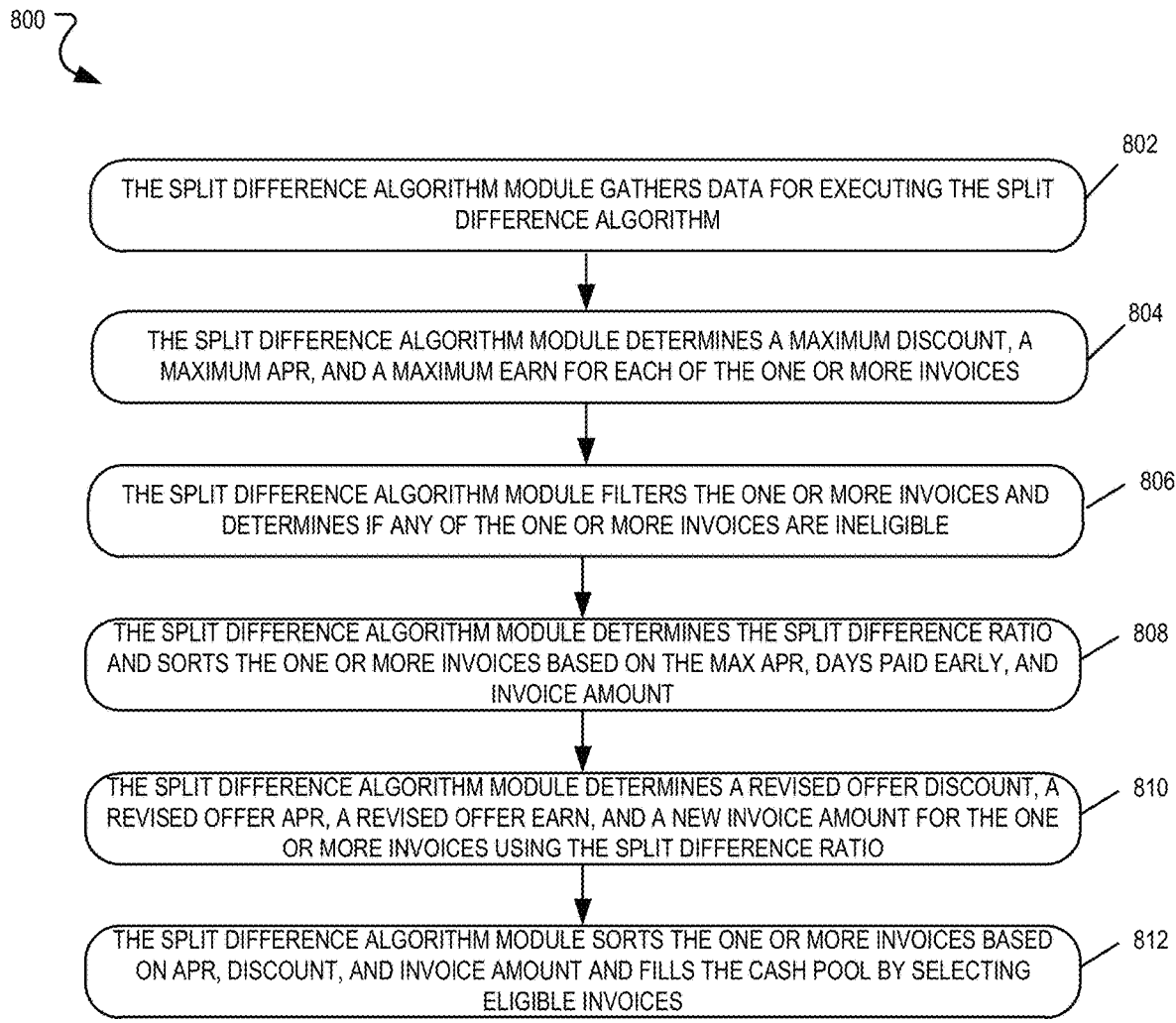
FIG. 8 illustrates a flowchart of a process for filling a cash pool using a split difference algorithm according to an example embodiment.

FIG. 8 illustrates a flowchart of a process 800 for filling a cash pool amount using the split difference algorithm according to an example embodiment. The process 800 shown in FIG. 8 begins at 802.

The server computing device 106 executes the split difference algorithm. At 802, the split difference algorithm module 512 gathers data for executing the split difference algorithm including buyer settings (cash pool amount, desired return, minimum APR acceptable, minimum earn acceptable, minimum invoice amount, and optional payment date) and inputs, data for the one or more invoices provided by the buyer user, and one or more offers on the one or more invoices submitted by the supplier users. In addition, the split difference algorithm module 512 determines a current split difference percentage, e.g., 50%, provided by an administrator.

At 804, the split difference algorithm module 512 determines a maximum discount, a maximum APR, and a maximum earn for each of the one or more invoices. At 806, the split difference algorithm module 512 filters the one or more invoices and determines if any of the one or more invoices are ineligible using the buyer settings (cash pool amount, desired return, minimum APR acceptable, minimum earn acceptable, minimum invoice amount, and optional payment date) and removes any ineligible invoices from consideration by the split difference algorithm.

At 808, the split difference algorithm module 512 determines the split difference ratio and sorts the one or more invoices based on one or more of maximum APR, days paid early, and invoice amount. The split difference algorithm module 512 determines the weighted APR for each invoice, the weighted average APR for all of the one or more invoices and the total invoice amount and removes any invoices from consideration if the weighted average APR is less than the desired return. When the weighted average APR is greater than or equal to the desired return, the split difference algorithm module 512 determines the split difference ratio based on the desired return, the weighted average APR, and the split difference percentage provided by the administrator.

At 810, the split difference algorithm module 512 determines a revised offer discount, a revised offer APR, a revised offer earn, and a new invoice amount for each of the remaining one or more invoices using the split difference ratio. At 812, the split difference algorithm module 512 fills the cash pool amount of the buyer by selecting eligible invoices. If the running cash total is less than the cash pool amount and the calculated weighted APR is greater than the desired APR, then an invoice is selected. If the running cash total is greater than the cash pool amount, the invoice is skipped. If the running cash total is less than the cash pool amount and the calculated weighted APR is less than the desired APR, the APR is raised up to the maximum for the offer. At this point, the split difference algorithm module 512 redetermines whether the offer is eligible for acceptance. Otherwise, the invoice is skipped. The split difference algorithm module 512 provides the buyer with an awarded amount and a return of the desired APR by selecting the invoices using the split difference algorithm.

Figure 9:
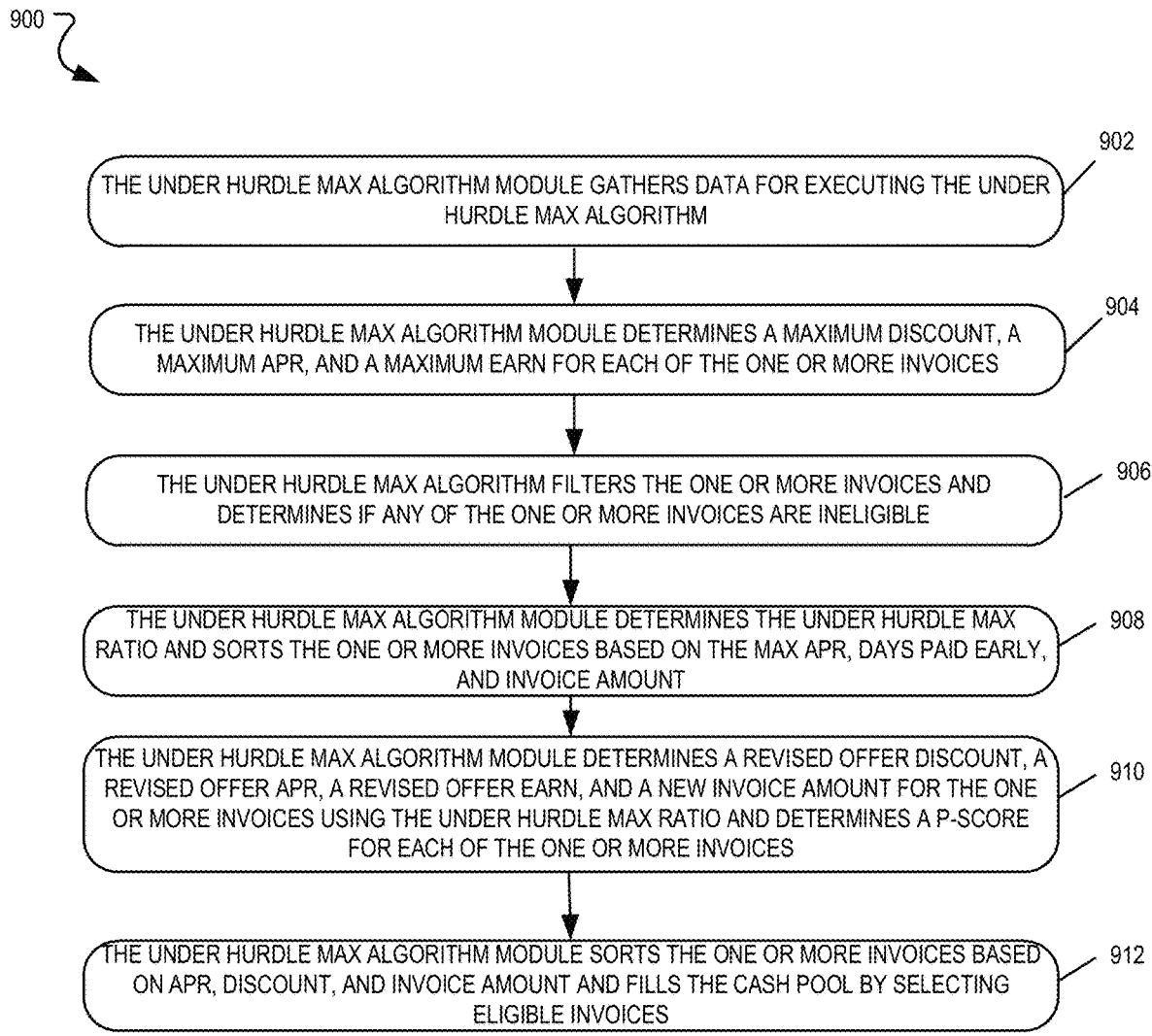
FIG. 9 illustrates a flowchart of a process for filling a cash pool using an under hurdle max algorithm according to an example embodiment.

FIG. 9 illustrates a flowchart of a process 900 for filling a cash pool amount using the under hurdle max algorithm according to an example embodiment. The process 900 shown in FIG. 9 begins at 902.

The server computing device 106 executes the under hurdle max algorithm. At 902, the under hurdle max algorithm module 514 gathers data for executing the under hurdle max algorithm including buyer settings (cash pool amount, desired return, minimum APR acceptable, minimum earn acceptable, minimum invoice amount, and optional payment date) and inputs, data for the one or more invoices provided by the buyer user, and one or more offers on the one or more invoices submitted by the supplier users. In addition, the under hurdle max algorithm module 514 determines an under hurdle percentage, a minimum offer percentage, and a percentile cutoff provided by an administrator.

At 904, the under hurdle max algorithm module 514 determines a maximum discount, a maximum APR, and a maximum earn for each of the one or more invoices. At 906, the under hurdle max algorithm module 514 filters the one or more invoices and determines if any of the one or more invoices are ineligible using the buyer settings (cash pool amount, desired return, minimum APR acceptable, minimum earn acceptable, minimum invoice amount, and optional payment date) and removes any ineligible invoices from consideration by the under hurdle max algorithm.

At 908, the under hurdle max algorithm module 514 determines the under hurdle max ratio and sorts the one or more invoices based on one or more of maximum APR, days paid early, and invoice amount. The under hurdle max algorithm module 514 determines the weighted APR for each invoice, the weighted average APR for all of the one or more invoices and the total invoice amount and removes any invoices from consideration if the weighted average APR is less than the desired return. The under hurdle max algorithm module 514 determines the under hurdle max ratio based on the weighted average APR, the desired return amount, and the minimum offer percentage. First, the under hurdle max algorithm module 514 determines the under hurdle max ratio based on the desired return amount and the weighted average APR. Second, the under hurdle max algorithm module 514 compares this under hurdle max ratio with the minimum offer percentage and selects the greater value.

At 910, the under hurdle max algorithm module 514 determines a revised offer discount, a revised offer APR, a revised offer earn, and a new invoice amount for each of the one or more invoices using the under hurdle max ratio. If the invoice max APR is less than the under hurdle percentage, then the under hurdle max ratio for this invoice is set to 1.0. If the invoice was determined to be ineligible or has been removed, then the under hurdle max ratio for this invoice is set to 1.0. Otherwise, the under hurdle max ratio for this invoice is set to (i) the under hurdle max ratio if the under hurdle max ratio is greater than the minimum offer percentage or (ii) the minimum offer percentage if the minimum offer percentage is greater than the under hurdle max ratio.

If the weighted average APR was determined to be less than the desired return amount, then the under hurdle max algorithm module 514 iteratively removes one or more of the lowest ranked invoices and recalculates the weighted average APR until the weighted average APR is equal to or greater than the desired return amount.

Once the weighted average APR is equal to or greater than the desired return amount, the under hurdle max algorithm module 514 determines a P-score for each of the invoices. If the P-score is less than the under hurdle percentage, then the invoice is removed. After removing any invoices, the under hurdle max algorithm module 514 recalculates the weighted average APR and the under hurdle max ratio until the under hurdle max ratio is less than the percentile cutoff. The under hurdle max algorithm module 514 iteratively removes invoices based on the P-score and recalculates the weighted average APR and the under hurdle max ratio.

At 912, after the under hurdle max algorithm module 514 determines an under hurdle max ratio that is under the percentile cutoff, the under hurdle max algorithm module 514 sorts the list of the one or more invoices by one or more of an offered APR, an offer discount, and a new invoice amount. The under hurdle max algorithm module 514 may take other factors into account when sorting the one or more invoices. After sorting the invoices, some of the one or more invoices are selected based on the new invoice amount by iterating through the one or more invoices. If the running cash total is less than the cash pool amount and the calculated weighted APR is greater than the desired APR, then an invoice is selected. If the running cash total is greater than the cash pool amount, the invoice is skipped. If the running cash total is less than the cash pool amount and the calculated weighted APR is less than the desired APR, the APR is raised up to the maximum for the offer. At this point, the under hurdle max algorithm module 514 redetermines whether the offer is eligible for acceptance. Otherwise, the invoice is skipped. In this case, the under hurdle max algorithm module 514 provides the buyer with an awarded amount and an under hurdle max return.

Figure 10:
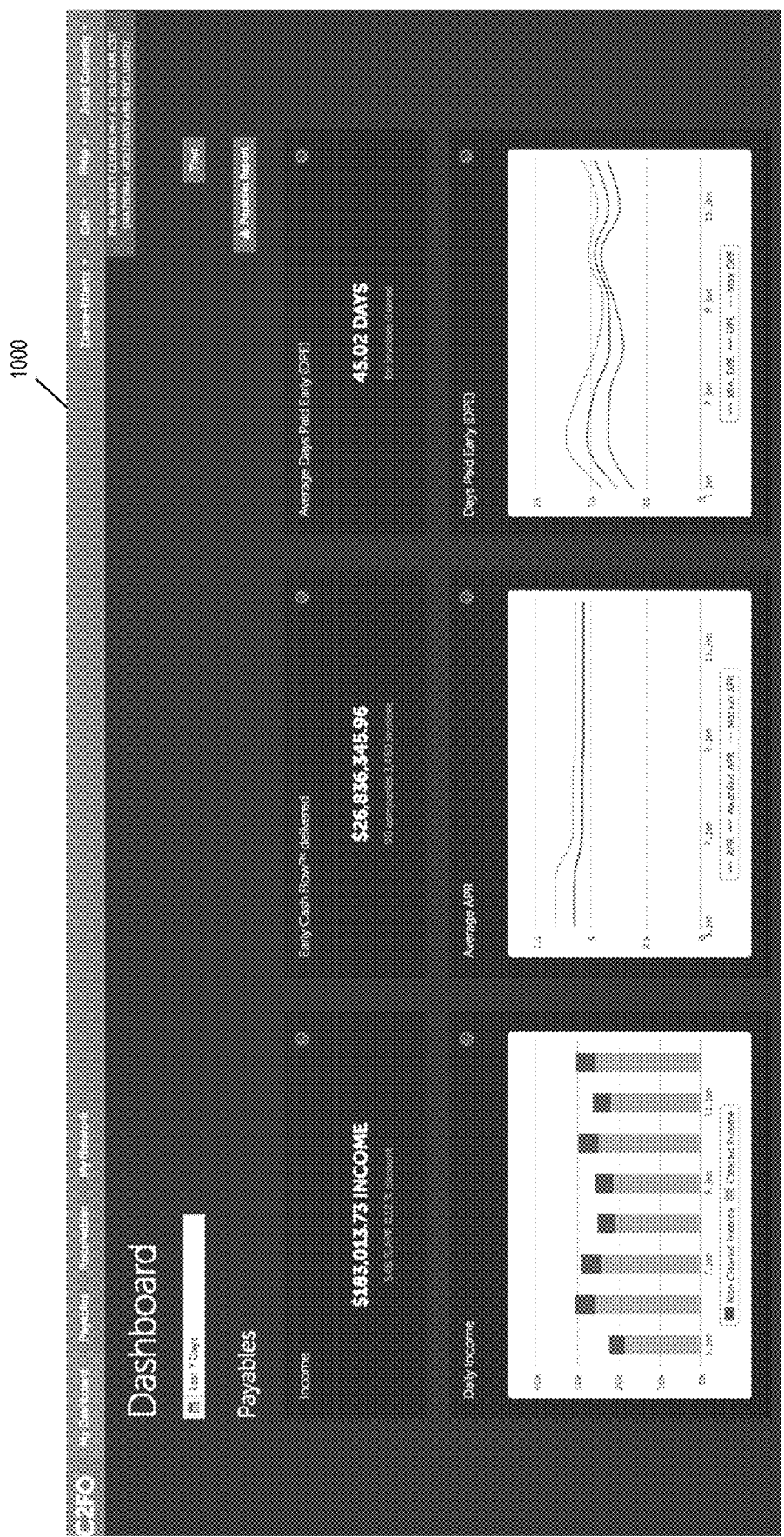

FIG. 10 shows a screenshot 1000 of a user interface displayed on the display 204 of the buyer client computing device 102. The screenshot 1000 shows a dashboard that a buyer user may view when they log into the marketplace.

Figure 11:
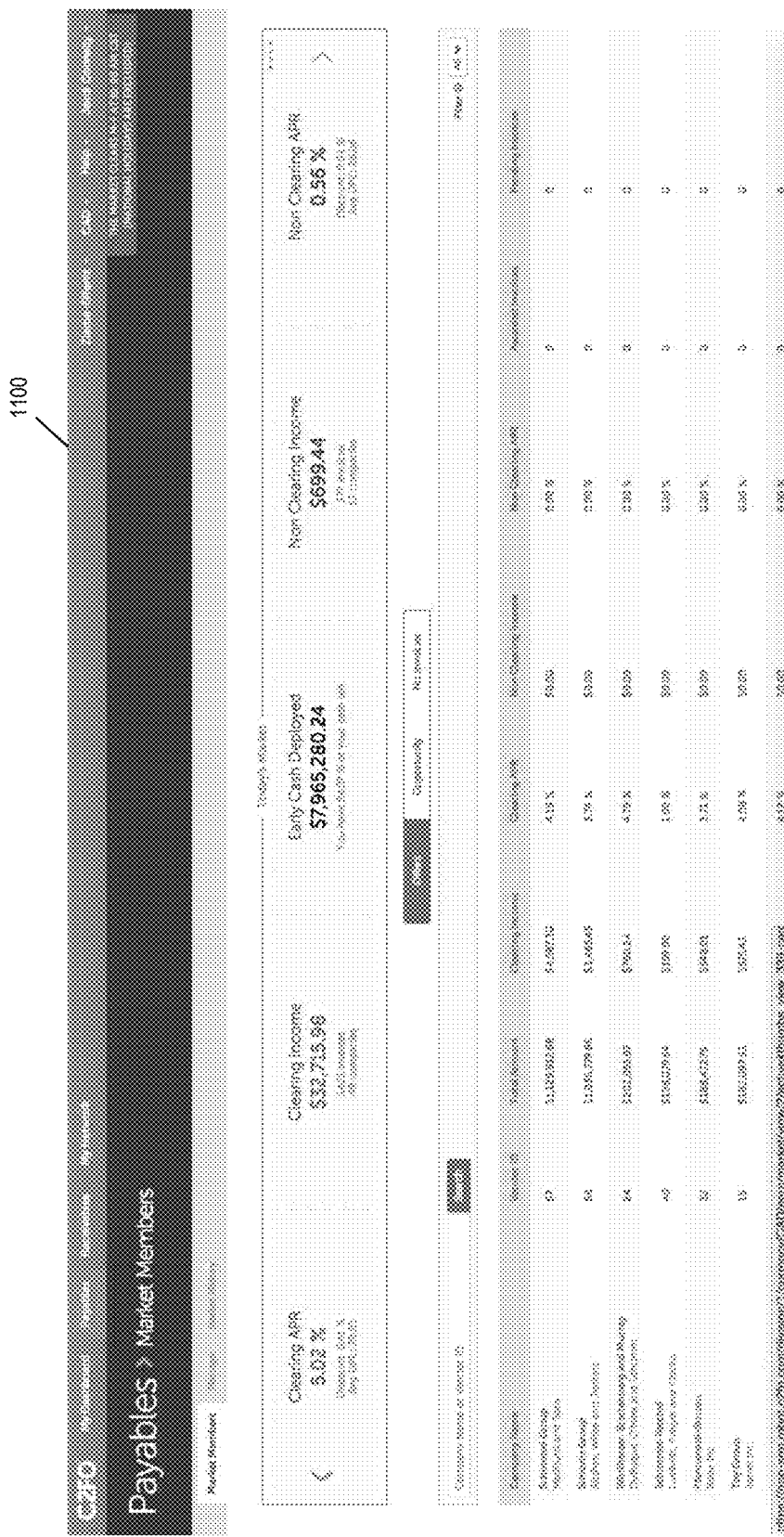

FIG. 11 shows another screenshot 1100 of a user interface displayed on the display 204 of the buyer client computing device 102. The screenshot 1100 shows payables for the buyer. Additionally, the screenshot 1100 shows information associated with the marketplace including a clearing APR, a clearing income, a cash pool amount, non-clearing income, and a non-clearing APR.

Figure 12:
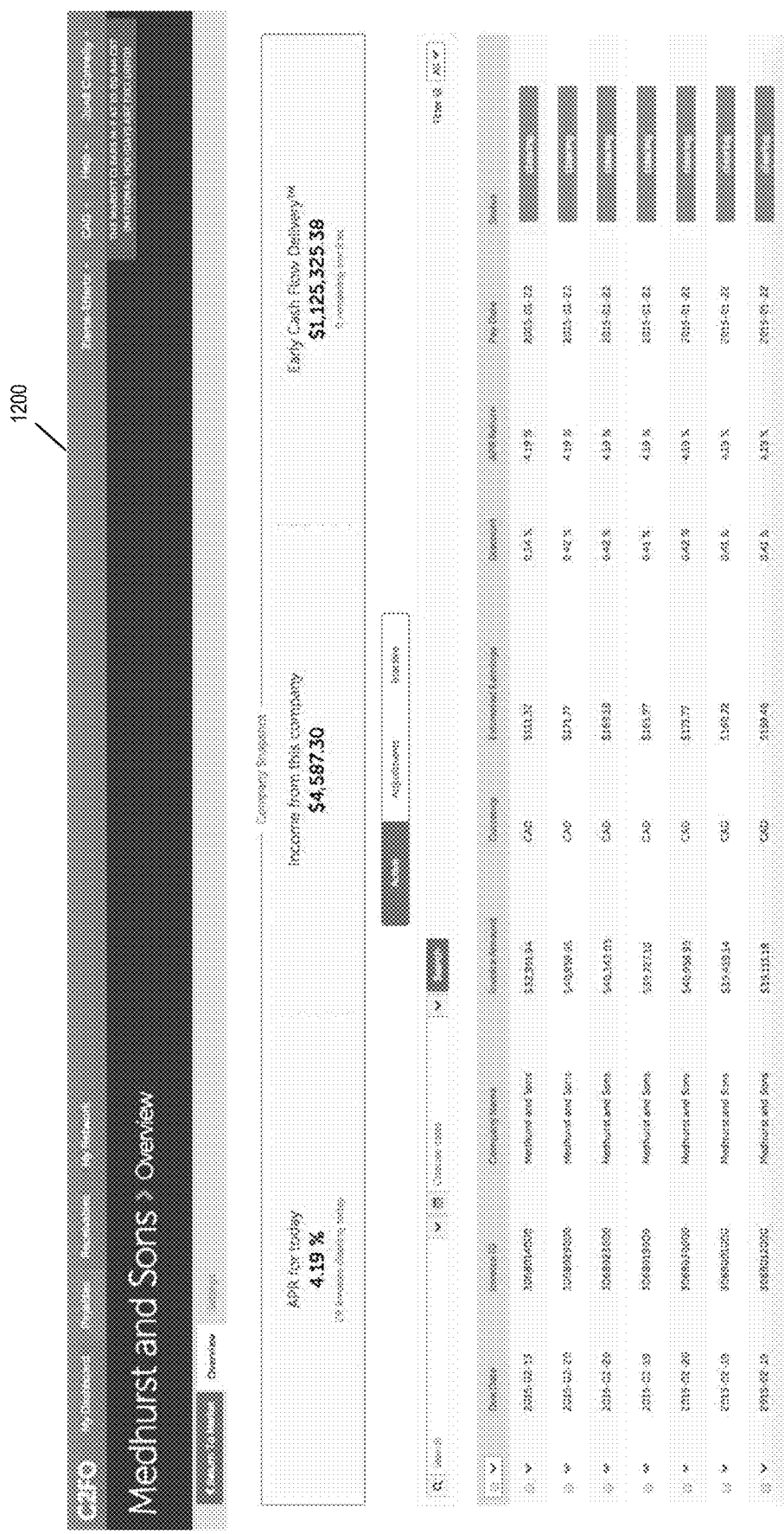

FIG. 12 shows an additional screenshot 1200 of a user interface displayed on the display 204 of the buyer client computing device 102. The screenshot 1200 shows a particular supplier for the buyer and the invoices associated with the particular supplier.

Figure 13:
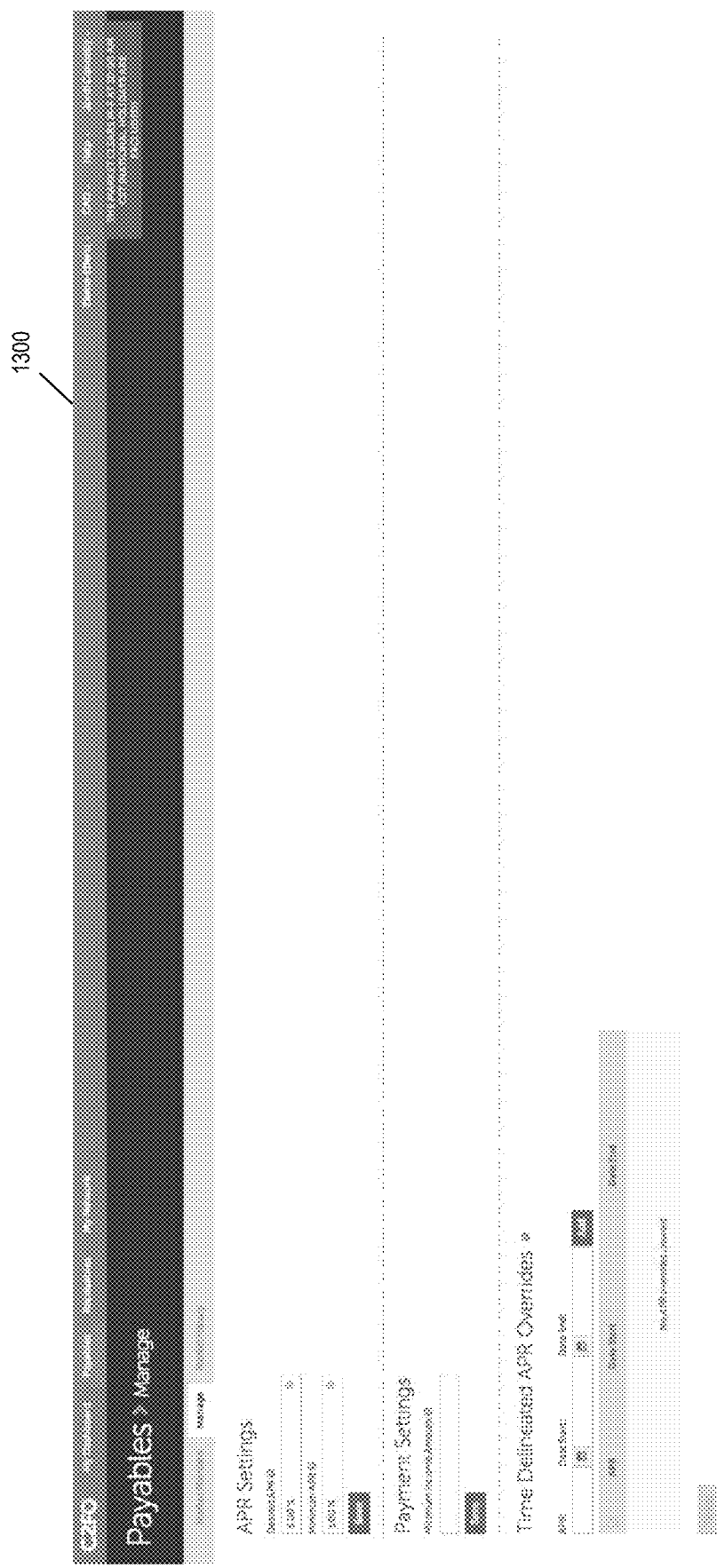

FIG. 13 shows another screenshot 1300 of a user interface displayed on the display 204 of the buyer client computing device 102. The screenshot 1300 shows a buyer settings user interface for the buyer. As shown in FIG. 13, the buyer may select a desired APR and a minimum APR for the marketplace in addition to other settings.

Figure 14:
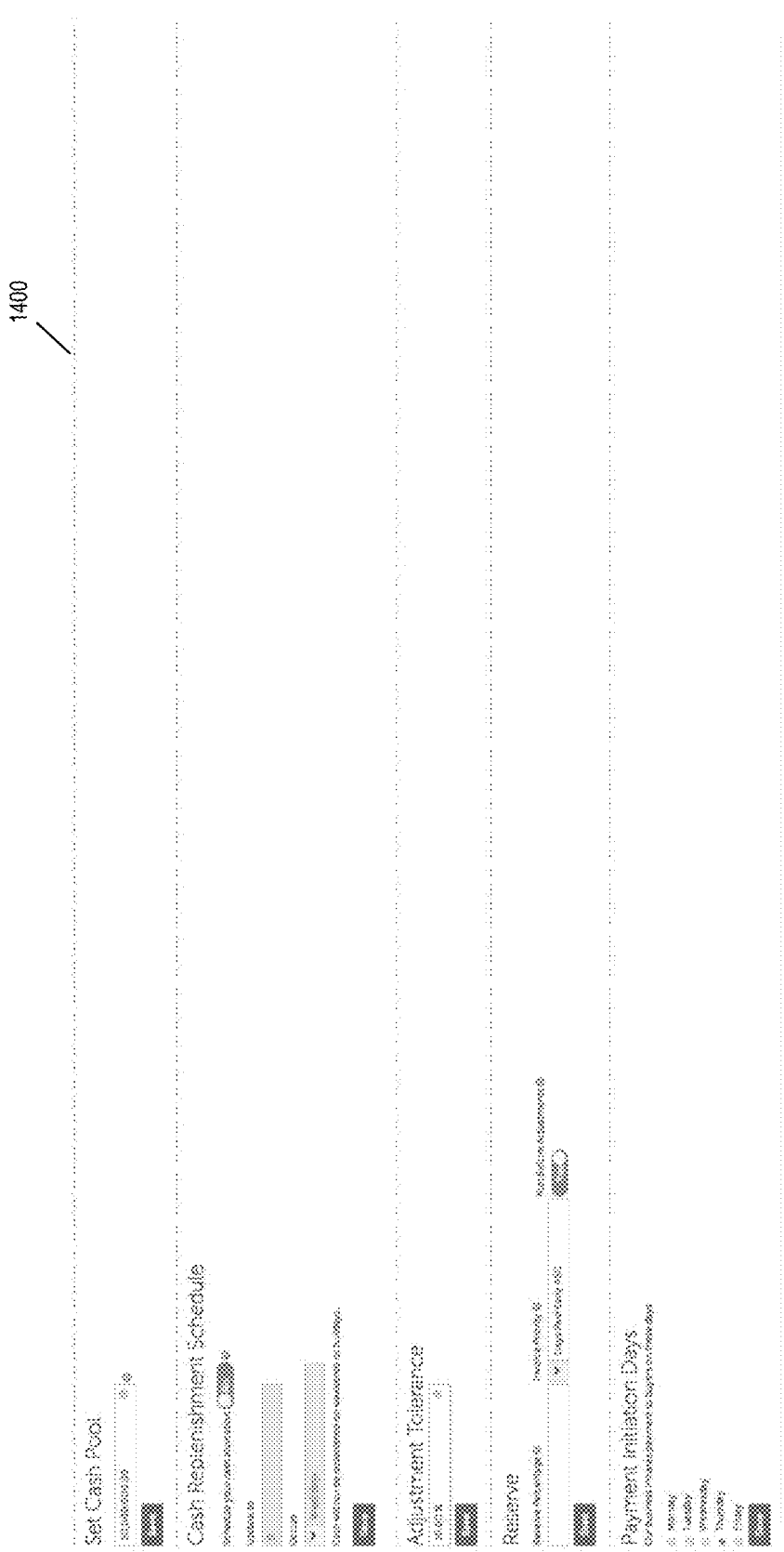

FIG. 14 shows an additional screenshot 1400 of a user interface displayed on the display 204 of the buyer client computing device 102. The screenshot 1400 shows an additional buyer settings user interface for the buyer. As shown in FIG. 14, the buyer may indicate a cash pool amount, a cash replenishment schedule, an adjustment tolerance, a reserve, and payment initiation days.

Figure 15:
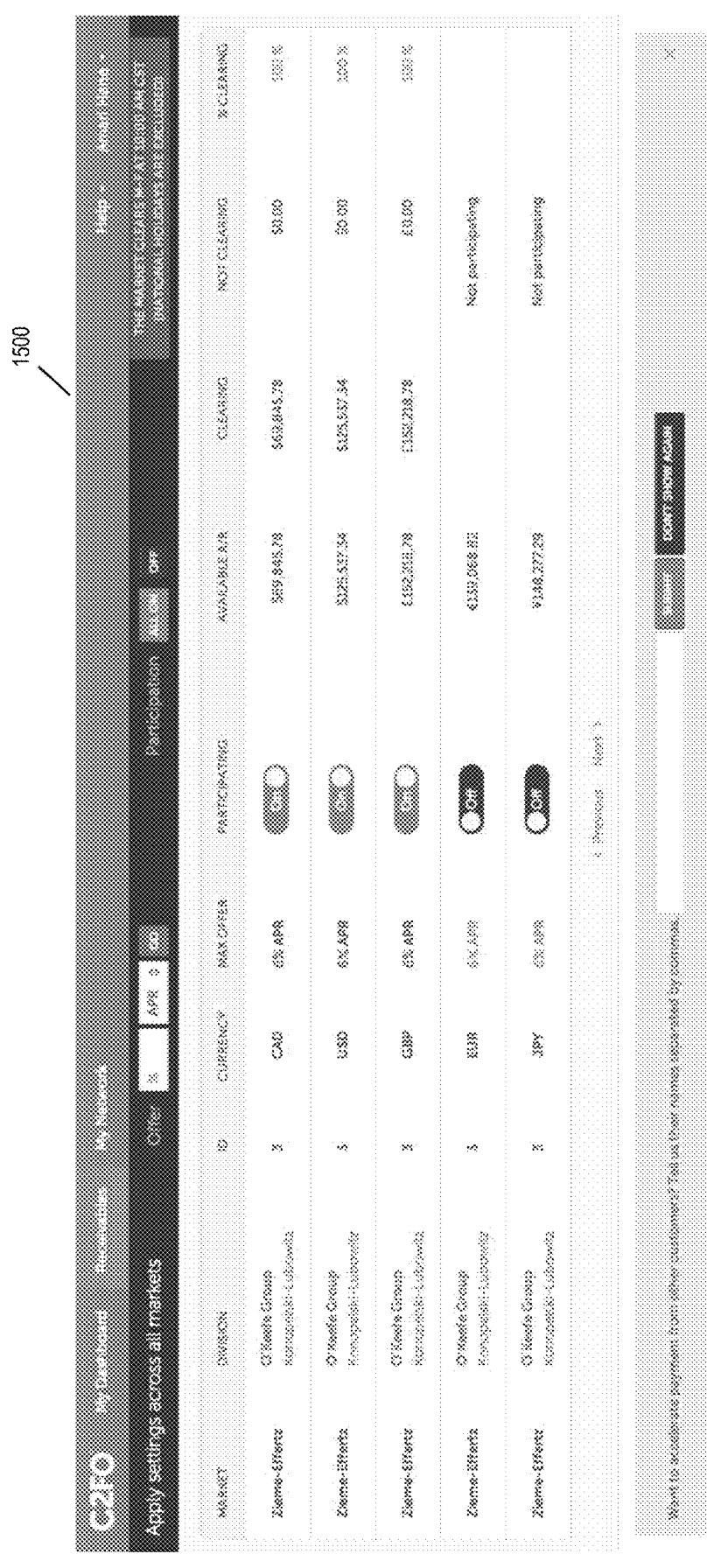

FIG. 15 shows another screenshot 1500 of a user interface displayed on the display 304 of the supplier client computing device 104. The screenshot 1500 shows a supplier user interface showing one or more receivables for the supplier.

Figure 16:

FIG. 16 shows an additional screenshot 1600 of a user interface displayed on the display 304 of the supplier client computing device 104. The screenshot 1600 shows a supplier user interface showing one or more receivables for the supplier that are associated with a particular buyer.

Figure 17:
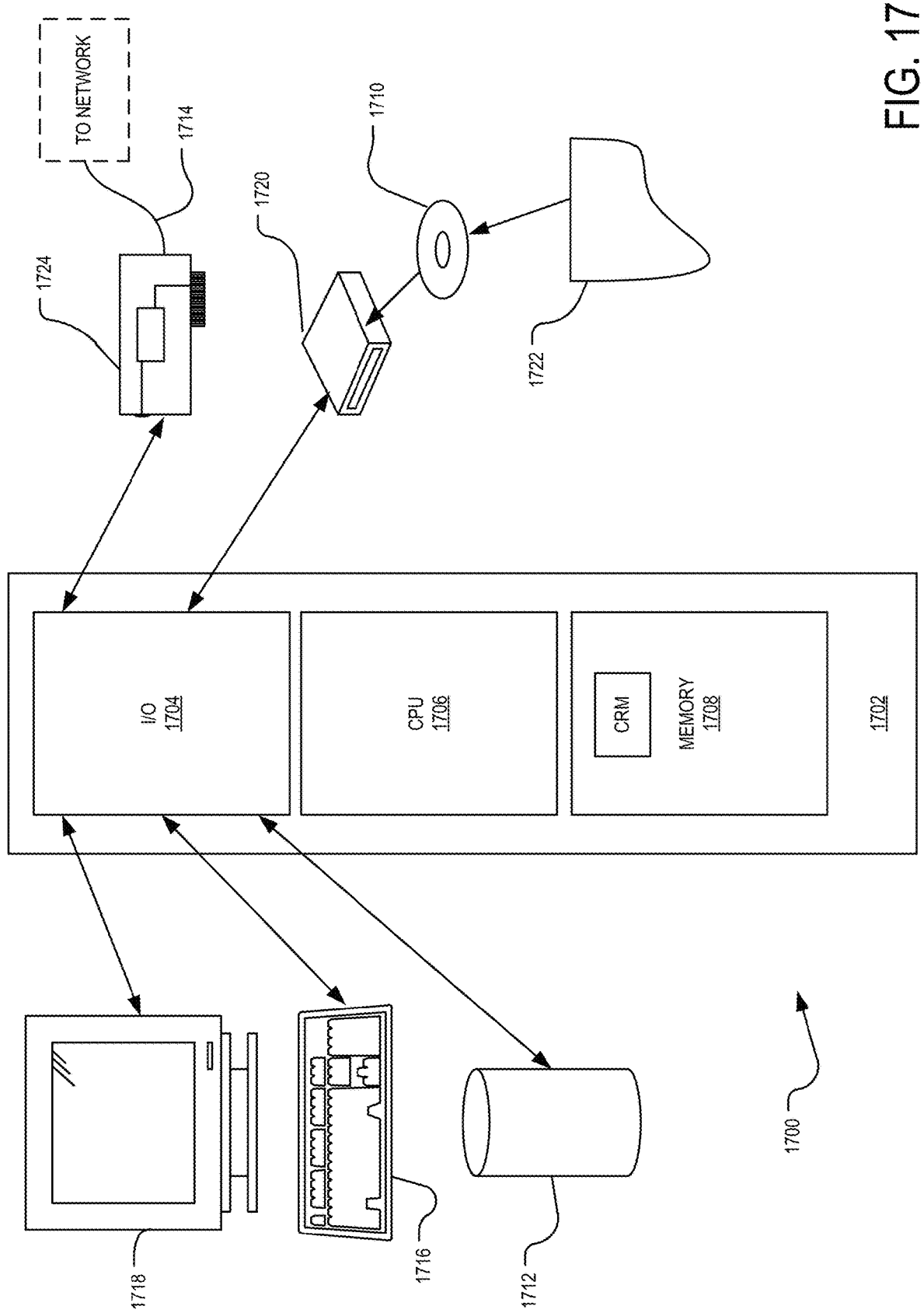
FIG. 17 illustrates a block diagram of an example computer device for use with the example embodiments.

FIG. 17 illustrates an example computing system 1700 that may implement various systems, such as the buyer client computing device 102, the supplier client computing device 104, and the server computing device 106, and the methods discussed herein, such as processes 600, 700, 800, and 900. A general purpose computer system 1700 is capable of executing a computer program product to execute a computer process. Data and program files may be input to the computer system 1700, which reads the files and executes the programs therein such as the web browser 202, the web browser 302, and the order application 402. Some of the elements of a general purpose computer system 1700 are shown in FIG. 17 wherein a processor 1702 is shown having an input/output (I/O) section 1704, a central processing unit (CPU) 1706, and a memory section 1708. There may be one or more processors 1702, such that the processor 1702 of the computer system 1700 comprises a single central-processing unit 1706, or a plurality of processing units, commonly referred to as a parallel processing environment. The computer system 1700 may be a conventional computer, a server, a distributed computer, or any other type of computer, such as one or more external computers made available via a cloud computing architecture. The presently described technology is optionally implemented in software devices loaded in memory 1708, stored on a configured DVD/CD-ROM 1710 or storage unit 1712, and/or communicated via a wired or wireless network link 1714, thereby transforming the computer system 1700 in FIG. 17 to a special purpose machine for implementing the described operations.

The memory section 1708 may be volatile media, non-volatile media, removable media, non-removable media, and/or other media or mediums that can be accessed by a general purpose or special purpose computing device. For example, the memory section 1708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1704 is connected to one or more user-interface devices (e.g., a keyboard 1716 and a display unit 1718), a disc storage unit 1712, and a disc drive unit 1720. Generally, the disc drive unit 1720 is a DVD/CD-ROM drive unit capable of reading the DVD/CD-ROM medium 1710, which typically contains programs and data 1722. Computer program products containing mechanisms to effectuate the systems and methods in accordance with the presently described technology may reside in the memory section 1704, on a disc storage unit 1712, on the DVD/CD-ROM medium 1710 of the computer system 1700, or on external storage devices made available via a cloud computing architecture with such computer program products, including one or more database management products, web server products, application server products, and/or other additional software components. Alternatively, a disc drive unit 1720 may be replaced or supplemented by a floppy drive unit, a tape drive unit, or other storage medium drive unit. The network adapter 1724 is capable of connecting the computer system 1700 to a network via the network link 1714, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1700 is connected (by wired connection and/or wirelessly) to a local network through the network interface or adapter 1724, which is one type of communications device. When used in a WAN-networking environment, the computer system 1700 typically includes a modem, a network adapter, or any other type of communications device for establishing communications over the wide area network. In a networked environment, program modules depicted relative to the computer system 1700 or portions thereof, may be stored in a remote memory storage device. It is appreciated that the network connections shown are examples of communications devices for and other means of establishing a communications link between the computers may be used.

In an example implementation, source code executed by the buyer client computing device 102, the supplier client computing device 104, and the server computing device 106, a plurality of internal and external databases, source databases, and/or cached data on servers are stored in the database 108, memory 114 of the buyer client computing device 102, memory 118 of the supplier client computing device 104, memory 122 of the server computing device 106, or other storage systems, such as the disk storage unit 1712 or the DVD/CD-ROM medium 1710, and/or other external storage devices made available and accessible via a network architecture. The source code executed by the buyer client computing device 102, the supplier client computing device 104, and the server computing device 106 may be embodied by instructions stored on such storage systems and executed by the processor 1702.

Some or all of the operations described herein may be performed by the processor 1702, which is hardware. Further, local computing systems, remote data sources and/or services, and other associated logic represent firmware, hardware, and/or software configured to control operations of the order system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1702 and a user may interact with a Graphical User Interface (GUI) using one or more user-interface devices (e.g., the keyboard 1716, the display unit 1718, and the user devices 1704) with some of the data in use directly coming from online sources and data stores. The system set forth in FIG. 17 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   one or more processors;
   non-transitory computer-readable medium having instructions stored thereon that, when executed by the one or more processors, cause the one or more processors to perform operations comprising:
   storing a first electronic document generated by an electronic resource planning software of a first computing device associated with a first entity, the first electronic document having a digital representations for a plurality of invoices, wherein each digital representation includes one or more fields indicating an amount owed by the first entity to a plurality of second entities for each of the plurality of invoices;
   providing a user interface to receive one or more requests associated with an offer from a particular second entity via a second computing device, the user interface including one or more digital representations of the first electronic document in combination with a selectable interface element that indicates the application of a weighted average offer return rate to the one or more digital representations, the weighted average offer return rate being equal to an invoice amount multiplied by an offer return rate associated with a particular invoice;

in response to receiving an asynchronous request to select the one or more digital representations via the user interface, identifying, from the selected one or more digital representations, a set of invoices for early payment that satisfy a cash pool amount provided by the first entity, wherein the set of invoices are identified based on:
 determining that a running total for the set of invoices is less than the cash pool amount and the weighted average offer return rate is less than a desired return rate of the first entity,
 raising the offer return rate for a particular offer up to a maximum return rate of a second entity, and
 redetermining whether a particular invoice is eligible for acceptance to include in the set of invoices; and
generating a second electronic document to be imported into the electronic resource planning software of the first computing device, the second electronic document including a revision of the one or more fields of the first electronic document indicating a change in the amount owed by the first entity.

2. The system of claim 1, wherein the one or more processors use at least one algorithm to determine whether each of the one or more requests is eligible for acceptance based on each offer return rate associated with each request and the desired return rate for the first entity and select one or more invoices associated with the selected one or more digital representations for early payment from the cash pool amount, the at least one algorithm comprising one of:
 an exact algorithm to select the one or more invoices to return exactly the desired return rate to the first entity and enable the plurality of second entities having the selected one or more invoices to retain any extra return over the desired return rate;
 a split difference algorithm to select the one or more invoices to return at least the desired return rate to the first entity and split at least some extra return over the desired return rate between the first entity and the plurality of second entities having the selected one or more invoices; and
 an under hurdle max algorithm to (i) exclude one or more first requests from the plurality of second entities that provide a lowest degree of return as compared with other requests of the one or more requests and (ii) select one or more second requests from the plurality of second entities that provide a highest degree of return as compared with the other requests of the one or more requests and select one or more third requests from one or more third entities that provide a degree of return between the lowest degree of return and the highest degree of return as compared with the other requests of the one or more requests to return at least the desired return rate to the first entity and split at least some extra return over the desired return rate between the first and the plurality of second entities.

3. The system of claim 2, wherein the exact algorithm comprises:
 gathering data for executing the exact algorithm comprising a minimum annual percentage rate (APR) acceptable to the first entity, a minimum earn acceptable to the first entity, and a minimum invoice amount;
 determining a maximum discount, a maximum APR, and a maximum earn for each of the one or more requests;
 excluding ineligible requests from consideration based on the minimum APR acceptable, the minimum earn acceptable, and the minimum invoice amount;
 sorting the eligible requests based on at least one of the maximum APR, a number of days paid early, and the invoice amount;
 determining an exact ratio based on the weighted average APR and the desired return rate;
 applying the exact ratio to an offer discount, an offer APR, an offer earn, and the invoice amount for each of the eligible requests;
 sorting the eligible requests based on at least one of the offer discount, the offer APR, and the invoice amount; and
 distributing exactly the desired return rate to the first entity by selecting some of the eligible requests based on the weighted average APR, the offer APR for each of eligible requests, and the invoice amount for each of the eligible requests.

4. The system of claim 2, wherein the split difference algorithm comprises:
 gathering data for executing the split difference algorithm comprising a minimum APR acceptable to the first entity, a minimum earn acceptable to the first entity, a minimum invoice amount, and a split difference percentage;
 determining a maximum discount, a maximum APR, and a maximum earn for each of the one or more requests;
 excluding ineligible requests from consideration based on the minimum APR acceptable, the minimum earn acceptable, and the minimum invoice amount;
 sorting the eligible requests based on at least one of a maximum APR, a number of days paid early, and the invoice amount;
 determining a weighted average APR based on the offer return rate for each of the eligible requests and comparing the weighted average APR with the desired return rate;
 determining a split difference ratio based on the weighted average APR, the desired return rate, and the split difference percentage;
 applying the split difference ratio to an offer discount, an offer APR, an offer earn, and the invoice amount for each of the eligible requests;
 sorting the eligible requests based on at least one of the offer discount, the offer APR, and the invoice amount; and
 distributing at least the desired return rate to the first entity and distributing the at least some extra return to the first entity and the plurality of second entities based on the split difference percentage by selecting some of the eligible requests based on the weighted average APR, the offer APR for each of the one or more requests, and the invoice amount for each of the eligible requests.

5. The system of claim 2, wherein the under hurdle max algorithm comprises:
 gathering data for executing the under hurdle max algorithm comprising a minimum APR acceptable to the first entity, a minimum earn acceptable to the first entity, a minimum invoice amount, an under hurdle percentage, a minimum request percentage, and a percentile cutoff;

determining a maximum discount, a maximum APR, and a maximum earn for each of the one or more requests;

excluding ineligible requests from consideration based on the minimum APR acceptable, the minimum earn acceptable, and the minimum invoice amount;

sorting the eligible requests based on at least one of a maximum APR, a number of days paid early, and the invoice amount;

determining a weighted average APR based on the offer return rate for each of the eligible requests and comparing the weighted average APR with the desired return rate;

determining an under hurdle max ratio based on the weighted average APR, the desired return rate, the minimum bid percentage, and the under hurdle percentage;

applying the under hurdle max ratio to an offer discount, an offer APR, an offer earn, and the invoice amount of each of the eligible requests until the under hurdle max ratio is less than the percentile cutoff;

determining a probability score for each of the eligible requests and excluding the one or more first requests from consideration because the probability score for each of one or more first requests is less than the under hurdle percentage, the probability score based on the offer APR and the offer earn;

sorting the eligible requests based on at least one of the offer discount, the offer APR, and the invoice amount; and distributing at least the desired return rate to the first entity based on the under hurdle max ratio by selecting the one or more second requests and the one or more third requests based on the weighted average APR, the offer APR for each of the eligible requests, and the invoice amount for each of the one or more second requests and the one or more third requests.

6. The system of claim 1, wherein the second electronic document further indicates amounts to be paid early by the first entity to each of the plurality of second entities whose selected one or more invoices are selected for early payment from the cash pool amount.

7. The system of claim 6, wherein the amounts to be paid early by the first entity to each of the plurality of second entities from the cash pool amount comprises an original amount of each of one or more invoices associated with the one or more selected digital representations less a determined return rate, the determined return rate being equal to at least the desired return rate of the first entity plus any extra return allocated to the first entity.

8. The system of claim 1, wherein the one or more processors:

transmits a plurality of request opportunities to the plurality of second entities in response to receiving the first electronic document the plurality of invoices; and receives the one or more requests responsive to the plurality of request opportunities.

9. The system of claim 8, wherein the one or more processors further store statistical information related to the plurality of request opportunities and the one or more requests responsive to the plurality request opportunities.

10. The system of claim 1, wherein each offer return rate from each corresponding second entity is unique to the corresponding second entity's financial status.

11. The system of claim 1, wherein the desired return rate of the first entity is one of a particular annual percentage rate (APR) or discount rate.

12. The system of claim 1, wherein each offer return rate from each corresponding second entity is one of a particular annual percentage rate (APR) or discount rate.

13. The system of claim 1, wherein each of the one or more requests comprises a disparate annual percentage rate (APR) or a disparate discount rate as the offer return rate in exchange for early payment of the at least one amount of at least one invoice owed by the first entity to the corresponding second entity.

14. The system of claim 1, wherein the one or more processors selects the one or more digital representations of the plurality of invoices to fulfill all of the cash pool amount or a portion of the cash pool amount.

15. The system of claim 1, wherein the one or more processors further store statistical information related to one or more of the first entity, the plurality of second entities, the one or more requests, the cash pool amount, prior requests, accounts receivables, amounts due, and invoice information.

16. The system of claim 1, wherein the one or more processors receive the first electronic document in a comma separated value (CSV) file and process the CSV file.

17. The system of claim 1, wherein the one or more processors receive the first electronic document in a comma separated value (CSV) file comprising an Enterprise Summary List of Accounts Payment (eSLAP) file and process the eSLAP file.

18. The system of claim 1, wherein the one or more processors transmit the second electronic document to the first entity in a comma separated value (CSV) file.

19. The system of claim 1, wherein the one or more processors transmits the second electronic document to the first entity in a comma separated value (CSV) file comprising an Enterprise Summary List of Accounts Payment (eSLAP) file.

20. The system of claim 1, wherein each invoice is associated with at least one of homogenous assets and homogenous liabilities.

21. The system of claim 1, wherein each invoice is associated with at least one of goods, services, payroll obligations, pension obligations, equity instruments, debt instruments, carbon credits, incentives created by government, and incentives created by industry regulation.

22. A computer implemented method comprising:

storing a first electronic document generated by an electronic resource planning software of a first computing device associated with a first entity, the first electronic document having digital representations for a plurality of invoices, each including one or more fields indicating an amount owed by the first entity to a plurality of second entities for each of the plurality of invoices;

providing a user interface to receive one or more requests associated with an offer from a particular second entity via a second computing device, the user interface including one or more digital representations of the first electronic document in combination with a selectable interface element that indicates the application of a weighted average offer return rate to the one or more digital representations, the weighted average offer return rate being equal to an invoice amount multiplied by an offer return rate associated with a particular invoice;

in response to receiving an asynchronous request to select the one or more digital representations via the user interface from the plurality of second entities, identifying, from the selected one or more digital representations, a set of invoices for early payment that satisfy a cash pool amount provided by the first entity, wherein the set of invoices are identified based on:
  determining that a running total for the set of invoices is less than the cash pool amount and the weighted average offer return rate is less than a desired return rate of the first entity,
  raising the offer return rate for a particular offer up to a maximum return rate of a second entity, and
  redetermining whether a particular invoice is eligible for acceptance to include in the set of invoices; and
generating a second electronic document to be imported into the electronic resource planning software of the first computing device, the second electronic document including a revision of the one or more fields of the first electronic document indicating a change in the amount owed by the first entity.

23. The computer implemented method of claim 22, further comprising using at least one algorithm to determine whether each of the one or more requests is eligible for acceptance based on each offer return rate associated with each request and the desired return rate for the first entity and select one or more invoices associated with the selected one or more digital representations for early payment from the cash pool amount, the at least one algorithm comprising one of:
  an exact algorithm to select the one or more invoices to return exactly the desired return rate to the first entity and enable the plurality of second entities having the selected one or more invoices to retain any extra return over the desired return rate;
  a split difference algorithm to select the one or more invoices to return at least the desired return rate to the first entity and split at least some extra return over the desired return rate between the first entity and the plurality of second entities having the selected one or more invoices; and
  an under hurdle max algorithm to (i) exclude one or more first requests from the plurality of second entities that provide a lowest degree of return as compared with other requests of the one or more requests and (ii) select one or more second requests from the plurality of second entities that provide a highest degree of return as compared with the other requests of the one or more requests and select one or more third requests from one or more third entities that provide a degree of return between the lowest degree of return and the highest degree of return as compared with the other requests of the one or more requests to return at least the desired return rate to the first entity and split at least some extra return over the desired return rate between the first and the plurality of second entities.

24. The computer implemented method of claim 23, wherein the exact algorithm comprises:
  gathering data for executing the exact algorithm comprising a minimum annual percentage rate (APR) acceptable to the first entity, a minimum earn acceptable to the first entity, and a minimum invoice amount;
  determining a maximum discount, a maximum APR, and a maximum earn for each of the one or more requests;
  excluding ineligible requests from consideration based on the minimum APR acceptable, the minimum earn acceptable, and the minimum invoice amount;
  sorting the eligible requests based on at least one of the maximum APR, a number of days paid early, and the invoice amount;
  determining an exact ratio based on the weighted average APR and the desired return rate;
  applying the exact ratio to an offer discount, an offer APR, an offer earn, and the invoice amount for each of the eligible requests;
  sorting the eligible requests based on at least one of the offer discount, the offer APR, and the invoice amount; and
  distributing exactly the desired return rate to the first entity by selecting some of the eligible requests based on the weighted average APR, the offer APR for each of eligible requests, and the invoice amount for each of the eligible requests.

25. The computer implemented method of claim 23, wherein the split difference algorithm comprises:
  gathering data for executing the split difference algorithm comprising a minimum APR acceptable to the first entity, a minimum earn acceptable to the first entity, a minimum invoice amount, and a split difference percentage;
  determining a maximum discount, a maximum APR, and a maximum earn for each of the one or more requests;
  excluding ineligible requests from consideration based on the minimum APR acceptable, the minimum earn acceptable, and the minimum invoice amount;
  sorting the eligible requests based on at least one of a maximum APR, a number of days paid early, and the invoice amount;
  determining a weighted average APR based on the offer return rate for each of the eligible requests and comparing the weighted average APR with the desired return rate;
  determining a split difference ratio based on the weighted average APR, the desired return rate, and the split difference percentage;
  applying the split difference ratio to an offer discount, an offer APR, an offer earn, and the invoice amount for each of the eligible requests;
  sorting the eligible requests based on at least one of the offer discount, the offer APR, and the invoice amount; and
  distributing at least the desired return rate to the first entity and distributing the at least some extra return to the first entity and the plurality of second entities based on the split difference percentage by selecting some of the eligible requests based on the weighted average APR, the offer APR for each of the one or more requests, and the invoice amount for each of the eligible requests.

26. The computer implemented method of claim 23, wherein the under hurdle max algorithm comprises:
  gathering data for executing the under hurdle max algorithm comprising a minimum APR acceptable to the first entity, a minimum earn acceptable to the first entity, a minimum invoice amount, an under hurdle percentage, a minimum request percentage, and a percentile cutoff;
  determining a maximum discount, a maximum APR, and a maximum earn for each of the one or more requests;
  excluding ineligible requests from consideration based on the minimum APR acceptable, the minimum earn acceptable, and the minimum invoice amount;
  sorting the eligible requests based on at least one of a maximum APR, a number of days paid early, and the invoice amount;

determining a weighted average APR based on the offer return rate for each of the eligible requests and comparing the weighted average APR with the desired return rate;

determining an under hurdle max ratio based on the weighted average APR, the desired return rate, the minimum bid percentage, and the under hurdle percentage;

applying the under hurdle max ratio to an offer discount, an offer APR, an offer earn, and the invoice amount of each of the eligible requests until the under hurdle max ratio is less than the percentile cutoff;

determining a probability score for each of the eligible requests and excluding the one or more first requests from consideration because the probability score for each of one or more first requests is less than the under hurdle percentage, the probability score based on the offer APR and the offer earn;

sorting the eligible requests based on at least one of the offer discount, the offer APR, and the invoice amount; and distributing at least the desired return rate to the first entity based on the under hurdle max ratio by selecting the one or more second requests and the one or more third requests based on the weighted average APR, the offer APR for each of the eligible requests, and the invoice amount for each of the one or more second requests and the one or more third requests.

27. The computer implemented method of claim 22, wherein the second electronic document further indicates amounts to be paid early by the first entity to each of the plurality of second entities whose selected one or more invoices are selected for early payment from the cash pool amount.

28. The computer implemented method of claim 27, wherein the amounts to be paid early by the first entity to each of the plurality of second entities from the cash pool amount comprises an original amount of each of one or more invoices associated with the one or more selected digital representations less a determined return rate, the determined return rate being equal to at least the desired return rate of the first entity plus any extra return allocated to the first entity.

29. The computer implemented method of claim 22, further comprising:

transmitting a plurality of request opportunities to the plurality of second entities in response to receiving the first electronic document the plurality of invoices; and receiving the one or more requests responsive to the plurality of request opportunities.

30. The computer implemented method of claim 29, further comprising storing statistical information related to the plurality of request opportunities and the one or more requests responsive to the plurality request opportunities.

31. The computer implemented method of claim 22, wherein each offer return rate from each corresponding second entity is unique to the corresponding second entity's financial status.

32. The computer implemented method of claim 22, wherein the desired return rate of the first entity is one of a particular annual percentage rate (APR) or discount rate.

33. The computer implemented method of claim 22, wherein each offer return rate from each corresponding second entity is one of a particular annual percentage rate (APR) or discount rate.

34. The computer implemented method of claim 22, wherein each of the one or more requests comprises a disparate annual percentage rate (APR) or a disparate discount rate as the offer return rate in exchange for early payment of the at least one amount of at least one invoice owed by the first entity to the corresponding second entity.

35. The computer implemented method of claim 22, further comprising selecting the one or more digital representations of the plurality of invoices to fulfill all of the cash pool amount or a portion of the cash pool amount.

36. The computer implemented method of claim 22, further comprising storing statistical information related to one or more of the first entity, the plurality of second entities, the one or more requests, the cash pool amount, prior requests, accounts receivables, amounts due, and invoice information.

37. The computer implemented method of claim 22, further comprising receiving the first electronic document in a comma separated value (CSV) file and process the CSV file.

38. The computer implemented method of claim 22, further comprising receiving the first electronic document in a comma separated value (CSV) file comprising an Enterprise Summary List of Accounts Payment (eSLAP) file and process the eSLAP file.

39. The computer implemented method of claim 22, further comprising transmitting the second electronic document to the first entity in a comma separated value (CSV) file.

40. The computer implemented method of claim 22, further comprising transmitting the second electronic document to the first entity in a comma separated value (CSV) file comprising an Enterprise Summary List of Accounts Payment (eSLAP) file.

41. The computer implemented method of claim 22, wherein each invoice is associated with at least one of homogenous assets and homogenous liabilities.

42. The computer implemented method of claim 22, wherein each invoice is associated with at least one of goods, services, payroll obligations, pension obligations, equity instruments, debt instruments, carbon credits, incentives created by government, and incentives created by industry regulation.

43. Non-transitory computer-readable media having instructions stored thereon that, when executed by one or more processors, cause the one or more processors to perform operations comprising:

storing a first electronic document generated by an electronic resource planning software of a first computing device associated with a first entity, the first electronic document indicative of a plurality of invoices, each including one or more fields indicating an amount owed by the first entity to a plurality of second entities for each of the plurality of invoices;

providing a user interface to receive one or more requests associated with an offer from a particular second entity via a second computing device, the user interface including a one or more digital representations of the first electronic document in combination with a selectable interface element that indicates the application of a weighted average offer return rate to the one or more digital representations, the weighted average offer return rate being equal to an invoice amount multiplied by an offer return rate associated with a particular invoice;

in response to receiving an asynchronous request to select the one or more digital representations via the user interface from the plurality of second entities, identifying, from the selected one or more digital representations, a set of invoices for early payment that satisfy a cash pool amount provided by the first entity, wherein the set of invoices are identified based on:
- determining that a running total for the set of invoices is less than the cash pool amount and the weighted average offer return rate is less than a desired return rate of the first entity,
- raising the offer return rate for a particular offer up to a maximum return rate of a second entity, and
- redetermining whether a particular invoice is eligible for acceptance to include in the set of invoices; and generating a second electronic document to be imported into the electronic resource planning software of the first computing device, the second electronic document including a revision of the one or more fields of the first electronic document indicating a change in the amount owed by the first entity.

44. The non-transitory computer-readable media of claim 43, further comprising using at least one algorithm to determine whether each of the one or more requests is eligible for acceptance based on each offer return rate associated with each request and the desired return rate for the first entity and select one or more invoices for early payment from the cash pool amount, the at least one algorithm comprising one of:
- an exact algorithm to select the one or more invoices to return exactly the desired return rate to the first entity and enable the plurality of second entities having the selected one or more invoices to retain any extra return over the desired return rate;
- a split difference algorithm to select the one or more invoices to return at least the desired return rate to the first entity and split at least some extra return over the desired return rate between the first entity and the plurality of second entities having the selected one or more invoices; and
- an under hurdle max algorithm to (i) exclude one or more first requests from the plurality of second entities that provide a lowest degree of return as compared with other requests of the one or more requests and (ii) select one or more second requests from the plurality of second entities that provide a highest degree of return as compared with the other requests of the one or more requests and select one or more third requests from one or more third entities that provide a degree of return between the lowest degree of return and the highest degree of return as compared with the other requests of the one or more requests to return at least the desired return rate to the first entity and split at least some extra return over the desired return rate between the first and the plurality of second entities.

45. The non-transitory computer-readable media of claim 44, wherein the exact algorithm comprises:
- gathering data for executing the exact algorithm comprising a minimum annual percentage rate (APR) acceptable to the first entity, a minimum earn acceptable to the first entity, and a minimum invoice amount;
- determining a maximum discount, a maximum APR, and a maximum earn for each of the one or more requests;
- excluding ineligible requests from consideration based on the minimum APR acceptable, the minimum earn acceptable, and the minimum invoice amount;
- sorting the eligible requests based on at least one of the maximum APR, a number of days paid early, and the invoice amount;
- determining an exact ratio based on the weighted average APR and the desired return rate;
- applying the exact ratio to an offer discount, an offer APR, an offer earn, and the invoice amount for each of the eligible requests;
- sorting the eligible requests based on at least one of the offer discount, the offer APR, and the invoice amount; and
- distributing exactly the desired return rate to the first entity by selecting some of the eligible requests based on the weighted average APR, the offer APR for each of eligible requests, and the invoice amount for each of the eligible requests.

46. The non-transitory computer-readable media of claim 44, wherein the split difference algorithm comprises:
- gathering data for executing the split difference algorithm comprising a minimum APR acceptable to the first entity, a minimum earn acceptable to the first entity, a minimum invoice amount, and a split difference percentage;
- determining a maximum discount, a maximum APR, and a maximum earn for each of the one or more requests;
- excluding ineligible requests from consideration based on the minimum APR acceptable, the minimum earn acceptable, and the minimum invoice amount;
- sorting the eligible requests based on at least one of a maximum APR, a number of days paid early, and the invoice amount;
- determining a weighted average APR based on the offer return rate for each of the eligible requests and comparing the weighted average APR with the desired return rate;
- determining a split difference ratio based on the weighted average APR, the desired return rate, and the split difference percentage;
- applying the split difference ratio to an offer discount, an offer APR, an offer earn, and the invoice amount for each of the eligible requests;
- sorting the eligible requests based on at least one of the offer discount, the offer APR, and the invoice amount; and
- distributing at least the desired return rate to the first entity and distributing the at least some extra return to the first entity and the plurality of second entities based on the split difference percentage by selecting some of the eligible requests based on the weighted average APR, the offer APR for each of the one or more requests, and the invoice amount for each of the eligible requests.

47. The non-transitory computer-readable media of claim 44, wherein the under hurdle max algorithm comprises:
- gathering data for executing the under hurdle max algorithm comprising a minimum APR acceptable to the first entity, a minimum earn acceptable to the first entity, a minimum invoice amount, an under hurdle percentage, a minimum request percentage, and a percentile cutoff;
- determining a maximum discount, a maximum APR, and a maximum earn for each of the one or more requests;
- excluding ineligible requests from consideration based on the minimum APR acceptable, the minimum earn acceptable, and the minimum invoice amount;
- sorting the eligible requests based on at least one of a maximum APR, a number of days paid early, and the invoice amount;
- determining a weighted average APR based on the offer return rate for each of the eligible requests and comparing the weighted average APR with the desired return rate;

determining an under hurdle max ratio based on the weighted average APR, the desired return rate, the minimum bid percentage, and the under hurdle percentage;

applying the under hurdle max ratio to an offer discount, an offer APR, an offer earn, and the invoice amount of each of the eligible requests until the under hurdle max ratio is less than the percentile cutoff;

determining a probability score for each of the eligible requests and excluding the one or more first requests from consideration because the probability score for each of one or more first requests is less than the under hurdle percentage, the probability score based on the offer APR and the offer earn;

sorting the eligible requests based on at least one of the offer discount, the offer APR, and the invoice amount; and distributing at least the desired return rate to the first entity based on the under hurdle max ratio by selecting the one or more second requests and the one or more third requests based on the weighted average APR, the offer APR for each of the eligible requests, and the invoice amount for each of the one or more second requests and the one or more third requests.

48. The non-transitory computer-readable media of claim 43, wherein the second electronic document further indicates amounts to be paid early by the first entity to each of the plurality of second entities whose selected one or more invoices are selected for early payment from the cash pool amount.

49. The non-transitory computer-readable media of claim 48, wherein the amounts to be paid early by the first entity to each of the plurality of second entities from the cash pool amount comprises an original amount of one or more invoices associated with the one or more selected digital representations less a determined return rate, the determined return rate being equal to at least the desired return rate of the first entity plus any extra return allocated to the first entity.

50. The non-transitory computer-readable media of claim 43, further comprising:

transmitting a plurality of request opportunities to the plurality of second entities in response to receiving the first electronic document the plurality of invoices; and receiving the one or more requests responsive to the plurality of request opportunities.

51. The non-transitory computer-readable media of claim 50, further comprising storing statistical information related to the plurality request opportunities and the one or more requests responsive to the plurality request opportunities.

52. The non-transitory computer-readable media of claim 43, wherein each offer return rate from each corresponding second entity is unique to the corresponding second entity's financial status.

53. The non-transitory computer-readable media of claim 43, wherein the desired return rate of the first entity is one of a particular annual percentage rate (APR) or discount rate.

54. The non-transitory computer-readable media of claim 43, wherein each offer return rate from each corresponding second entity is one of a particular annual percentage rate (APR) or discount rate.

55. The non-transitory computer-readable media of claim 43, wherein each of the one or more requests comprises a disparate annual percentage rate (APR) or a disparate discount rate as the offer return rate in exchange for early payment of the at least one amount of at least one invoice owed by the first entity to the corresponding second entity.

56. The non-transitory computer-readable media of claim 43, further comprising selecting the one or more digital representations of the plurality of invoices to fulfill all of the cash pool amount or a portion of the cash pool amount.

57. The non-transitory computer-readable media of claim 43, further comprising storing statistical information related to one or more of the first entity, the plurality of second entities, the one or more requests, the cash pool amount, prior requests, accounts receivables, amounts due, and invoice information.

58. The non-transitory computer-readable media of claim 43, further comprising receiving the first electronic document in a comma separated value (CSV) file and process the CSV file.

59. The non-transitory computer-readable media of claim 43, further comprising receiving the first electronic document in a comma separated value (CSV) file comprising an Enterprise Summary List of Accounts Payment (eSLAP) file and process the eSLAP file.

60. The non-transitory computer-readable media of claim 43, further comprising transmitting the second electronic document to the first entity in a comma separated value (CSV) file.

61. The non-transitory computer-readable media of claim 43, further comprising transmitting the second electronic document to the first entity in a comma separated value (CSV) file comprising an Enterprise Summary List of Accounts Payment (eSLAP) file.

62. The non-transitory computer-readable media of claim 43, wherein each invoice is associated with at least one of homogenous assets and homogenous liabilities.

63. The non-transitory computer-readable media of claim 43, wherein each invoice is associated with at least one of goods, services, payroll obligations, pension obligations, equity instruments, debt instruments, carbon credits, incentives created by government, and incentives created by industry regulation.

* * * * *